US010234565B2

(12) United States Patent
Wilson et al.

(10) Patent No.: US 10,234,565 B2
(45) Date of Patent: *Mar. 19, 2019

(54) GLOBAL NAVIGATION SATELLITE SYSTEM RECEIVER CONVERGENCE SELECTION

(71) Applicant: Trimble Inc., Sunnyvale, CA (US)

(72) Inventors: Eric Wilson, Cupertino, CA (US); Stephan Seeger, Hoehenkirchen-Siegertsbrunn (DE)

(73) Assignee: Trimble Inc., Sunnyvale, CA (US)

( * ) Notice: Subject to any disclaimer, the term of this patent is extended or adjusted under 35 U.S.C. 154(b) by 583 days.

This patent is subject to a terminal disclaimer.

(21) Appl. No.: 14/619,829

(22) Filed: Feb. 11, 2015

(65) Prior Publication Data

US 2016/0231429 A1 Aug. 11, 2016

(51) Int. Cl.
*G01S 19/44* (2010.01)
*G01S 19/35* (2010.01)

(52) U.S. Cl.
CPC ............. *G01S 19/44* (2013.01); *G01S 19/35* (2013.01)

(58) Field of Classification Search
CPC .......... G01S 19/24; G01S 19/26; G01S 19/34; G01S 19/29; G01S 19/30; G01S 19/35; G01S 19/43; G01S 19/44; G01S 19/45; G01S 19/47; G01S 19/48; G01S 19/49; G01S 5/00; G01S 5/0018; G01S 5/0045; G01S 5/0063; G01S 5/009; G01S 5/021; G01S 5/0236; G01S 5/0257; G01S 5/0263; G01S 5/0278; G01S 5/14; G01S 5/145

See application file for complete search history.

(56) References Cited

U.S. PATENT DOCUMENTS

| 6,061,632 | A * | 5/2000 | Dreier ................ G01S 19/07 342/357.48 |
| 2003/0004640 | A1 * | 1/2003 | Vayanos .............. G01S 5/14 701/469 |
| 2003/0058163 | A1 * | 3/2003 | Zimmerman .......... G01S 5/009 342/357.72 |
| 2006/0132431 | A1 * | 6/2006 | Eliezer ................ G06F 1/1616 345/156 |
| 2006/0282205 | A1 * | 12/2006 | Lange ................. G01C 21/20 701/50 |
| 2010/0141515 | A1 * | 6/2010 | Doucet ................ G01S 19/40 342/357.55 |

(Continued)

*Primary Examiner* — Vladimir Magloire
*Assistant Examiner* — Daniel P Malley, Sr.
(74) *Attorney, Agent, or Firm* — Kilpatrick Townsend & Stockton LLP

(57) ABSTRACT

A method of implementing convergence selection of a Global Navigation Satellite System (GNSS) receiver is disclosed. In accordance with one embodiment, a GNSS receiver which is coupled with a mobile machine is shut down. The GNSS receiver is in a converged state at shut down. A movement sensor is monitored to determine if net movement of a GNSS antenna coupled with the mobile machine exceeds a threshold net movement parameter while the GNSS receiver is shut down. Upon power up of the GNSS receiver, a shorter convergence algorithm is initiated in response to determining that the threshold net movement parameter has not been exceeded and a longer convergence algorithm is initiated in response to determining that the threshold net movement parameter has been exceeded.

24 Claims, 12 Drawing Sheets

(56) References Cited

U.S. PATENT DOCUMENTS

| | | | | |
|---|---|---|---|---|
| 2012/0286991 | A1* | 11/2012 | Chen | G01S 19/04 342/357.23 |
| 2012/0293366 | A1* | 11/2012 | Liu | G01S 19/24 342/357.26 |
| 2013/0231823 | A1* | 9/2013 | Wang | A01B 69/008 701/24 |
| 2013/0335266 | A1* | 12/2013 | Vollath | G01S 19/43 342/357.25 |
| 2014/0002300 | A1* | 1/2014 | Leandro | G01S 19/44 342/357.27 |
| 2016/0075305 | A1* | 3/2016 | Kawakatsu | B60R 22/48 280/801.1 |

* cited by examiner

700

```
┌─────────────────────────────────────────────────────┐
│ SHUTTING DOWN A GLOBAL NAVIGATION SATELLITE SYSTEM  │
│ (GNSS) RECEIVER WHICH IS COUPLED WITH A MOBILE      │
│ MACHINE, WHEREIN THE GNSS RECEIVER IS IN A          │
│ CONVERGED STATE AT SHUT DOWN                        │
│ 710                                                 │
└─────────────────────────────────────────────────────┘
                          │
                          ▼
┌─────────────────────────────────────────────────────┐
│ MONITORING A MOVEMENT SENSOR TO DETERMINE IF        │
│ MOVEMENT OF THE GNSS ANTENNA COUPLED WITH THE       │
│ MOBILE MACHINE EXCEEDS A THRESHOLD NET MOVEMENT     │
│ PARAMETER WHILE THE GNSS RECEIVER IS SHUT DOWN      │
│ 720                                                 │
└─────────────────────────────────────────────────────┘
                          │
                          ▼
┌─────────────────────────────────────────────────────┐
│ UPON POWER UP OF THE GNSS RECEIVER, INITIATING A    │
│ SHORTER CONVERGENCE ALGORITHM IN RESPONSE TO        │
│ DETERMINING THAT THE THRESHOLD NET MOVEMENT         │
│ PARAMETER HAS NOT BEEN EXCEEDED AND INITIATING A    │
│ LONGER CONVERGENCE ALGORITHM IN RESPONSE TO         │
│ DETERMINING THAT THE THRESHOLD NET MOVEMENT         │
│ PARAMETER HAS BEEN EXCEEDED                         │
│ 730                                                 │
└─────────────────────────────────────────────────────┘
```

FIG. 7

GLOBAL NAVIGATION SATELLITE SYSTEM RECEIVER CONVERGENCE SELECTION

BACKGROUND

The Global Positioning System (GPS) and its extensions in the Global Navigation Satellite Systems (GNSS) have become thoroughly pervasive in all parts of human society, worldwide. GPS and GNSS receivers are increasingly being integrated into devices, tools, and vehicles such as agricultural vehicles, construction equipment, and even in autonomously operated vehicles. In order to control the vehicles safely and with a necessary degree of precision, GNSS receivers are configured to utilize corrections data from various sources in conjunction with locally derived data. Implementations of these corrections systems include the Wide Area Augmentation System (WAAS), the Satellite-Based Augmentation System (SBAS), the Real-time Kinematic (RTK) technique, the Precise Point Positioning (PPP) technique, and the European Geostationary Navigation Overlay Service (EGNOS). Using data from these sources, a GNSS receiver can account for error sources such as atmospheric delay of clock signals, clock errors, ephemeris errors, etc. to derive a more precise position fix.

When first started up, a GNSS receiver using correction data initiates a process called "convergence" in which carrier phase ambiguities between the locally received signals and the correction data are resolved. Using the carrier phase observations, phase ambiguities are resolved to near constant values. A number of factors influence how fast convergence will take within a pre-defined level of precision. Such factors include, but are not limited to the number and geometry of visible satellites, the quality of the observations made by the GNSS receivers involved, sampling rate, availability of ionospheric corrections, etc. In a typical scenario, it takes approximately 30 minutes or more for a receiver to converge its locally received signals with the correction data it receives in a cold-start. Upon start-up a previously converged GNSS receiver can leverage its previously known position to shorten the convergence process to a few minutes or less. However, if a previously converged receiver has been moved after shut-down, it will attempt to use its previous known position for convergence upon start-up. This results in the convergence process taking longer than the approximately 30 minute period it would have taken if the GNSS receiver had performed a cold-start convergence.

BRIEF DESCRIPTION OF THE DRAWINGS

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale. Herein, like items are labeled with like item numbers.

FIG. 7 is a flowchart of a method of implementing convergence selection of a Global Navigation Satellite System (GNSS) receiver in accordance with at least one embodiment.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope of the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Unless specifically stated otherwise, as apparent from the following discussions, it is appreciated that throughout the description of embodiments, discussions utilizing terms such as "shutting down," "monitoring," "determining," "initiating," and "generating" refer to the actions and processes used to transform the state of a computer system, data storage system, storage system controller, microcontroller, hardware processor, or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices.

Figure 1:
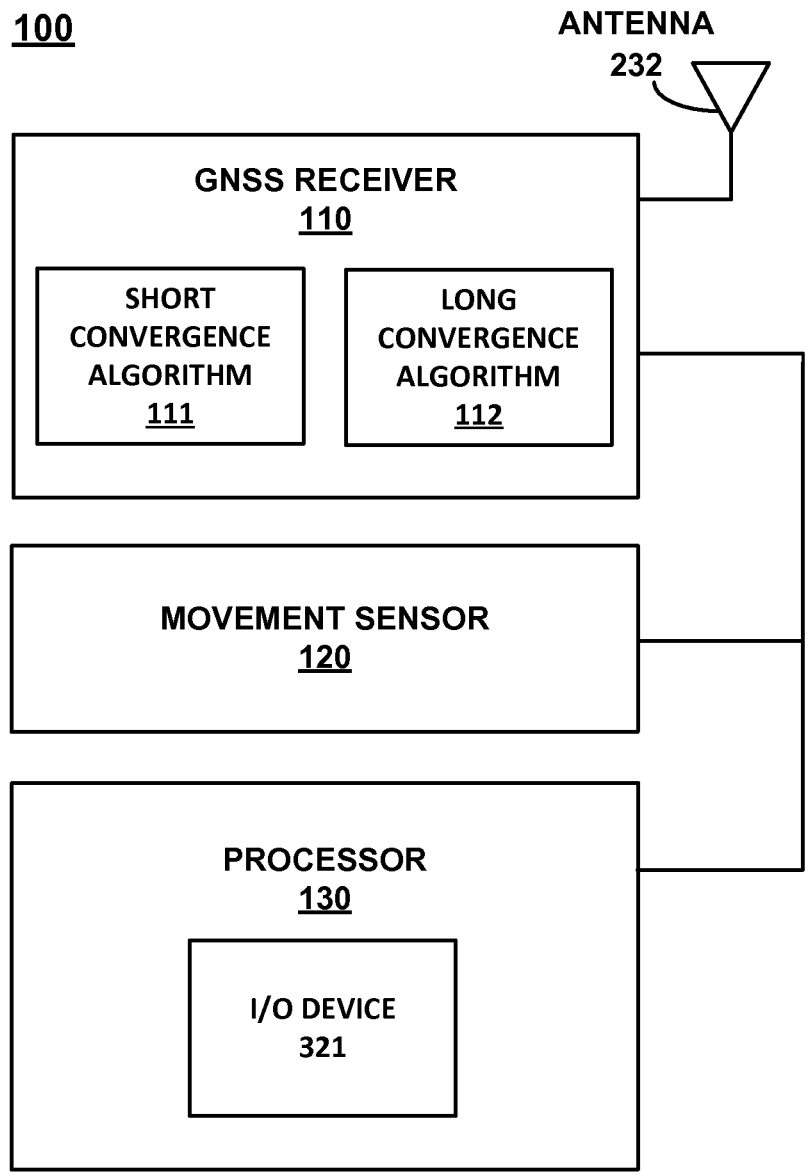
FIG. 1 shows components used in a convergence selection system in accordance with various embodiments.

FIG. 1 shows components used in a convergence selection system 100 in accordance with various embodiments. In FIG. 1, convergence selection system 100 comprises a GNSS receiver 110, which further comprises a GNSS antenna (e.g., 232 of FIG. 2), coupled with a movement sensor 120 and a processor 130 which is coupled with the above components via an input/output (I/O) device 321 as is described in greater detail below. GNSS receiver 110 may be a type of precise point positioning (PPP) GNSS receiver. As will be discussed in greater detail below with reference to FIG. 2, GNSS receiver 110 is configured to autonomously determine its position and is further configured for receiving correction data from various sources. In accordance with at least one embodiment, GNSS receiver 110 is coupled with a mobile machine 600 and is configured to use correction data to operate in a converged state in which carrier phase ambiguity between the locally received signals and the correction data is resolved. It is noted that in accordance with various embodiments GNSS receiver, and/or movement sensor 120 and processor 130, may be coupled with a non-mobile device as described below. As shown in FIG. 1, GNSS receiver 110 is configured to operate a short convergence algorithm 111 (e.g., 1200 of FIG. 12) and a long convergence algorithm 112 (e.g., 1100 of FIG. 11). When the location of GNSS receiver is not known, a cold-start-up is performed using long convergence algorithm 112. As was previously discussed, when a GNSS receiver is shut down from a converged operating state, it can leverage its previously known position to expedite the convergence operation, using a shorter convergence algorithm (e.g., 111 of FIG. 1), when it is subsequently powered up if its GNSS antenna is in essentially the same location, or within a threshold net movement parameter, from when the GNSS receiver was shut down. However, if a previously converged GNSS receiver (e.g., 110) has moved after shut down, and attempts to perform a convergence operation when powered up using its previously known position in conjunction with short convergence algorithm 111, errors occur which result in the convergence process taking far longer (e.g., approximately an hour) than if GNSS receiver 110 had used an available longer convergence algorithm (e.g., 112 of FIG. 1) to begin with. More specifically, if the antenna 232 of a previously converged GNSS receiver (e.g., 110) has moved beyond a given distance, using the short convergence algorithm 111 results in errors which cause the convergence process to take longer than if long convergence algorithm 112 had been initiated from the start. It is noted that antenna 232 is described as a component of GNSS receiver 110 in various embodiments. However, antenna 232 may be mounted remote from any of GNSS receiver 110, movement sensor 120, and/or processor 130 in accordance with various embodiments. For example, in accordance with at least one embodiment, antenna 232 may be a magnetically mountable model commercially available from Trimble Navigation Limited of Sunnyvale, Calif.

Figure 2:
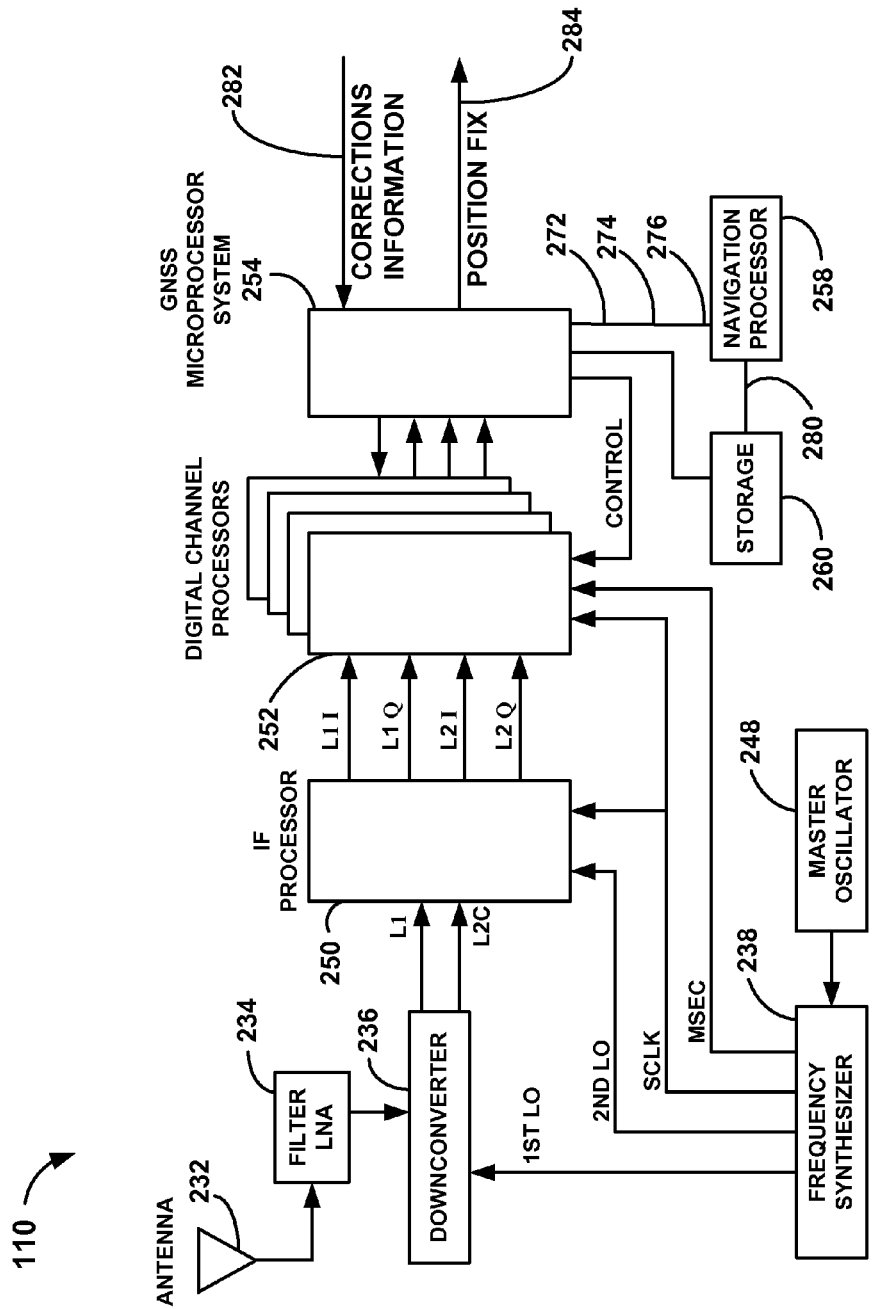
FIG. 2 depicts a block diagram of a GNSS receiver, according to one embodiment.
Figure 3:
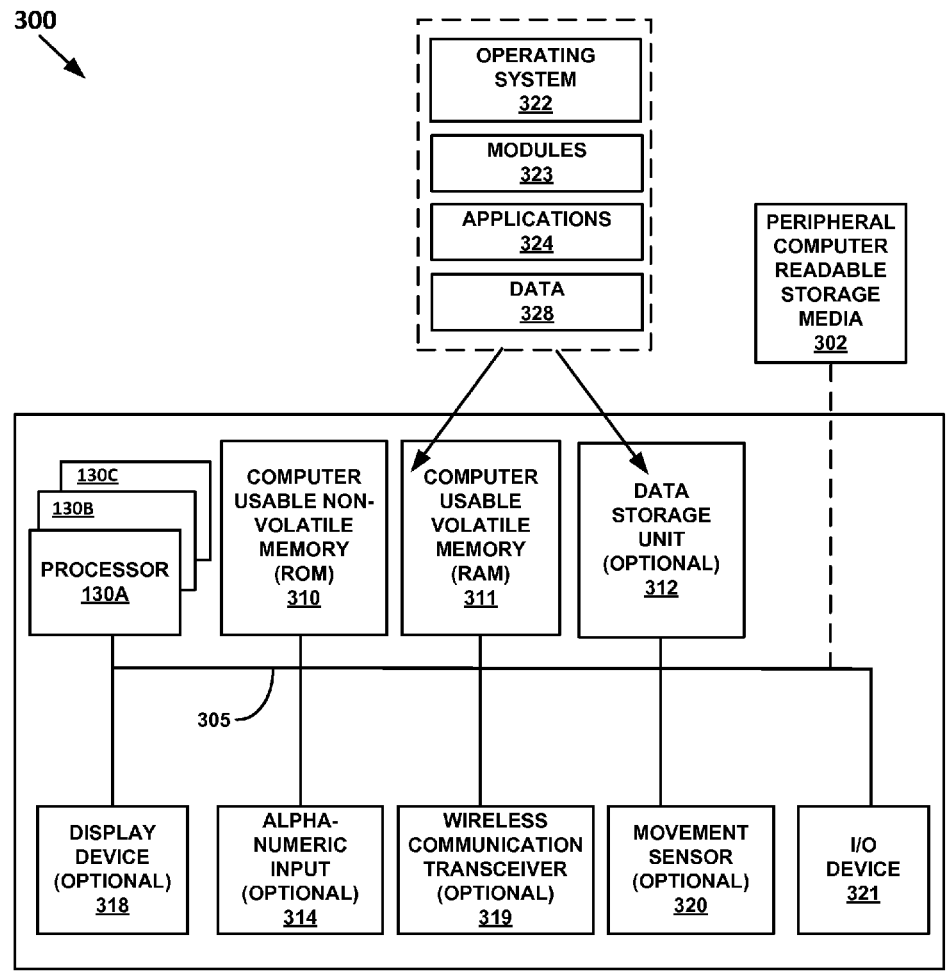
FIG. 3 is a block diagram of an example computer system, according to various embodiments.
Figure 4:
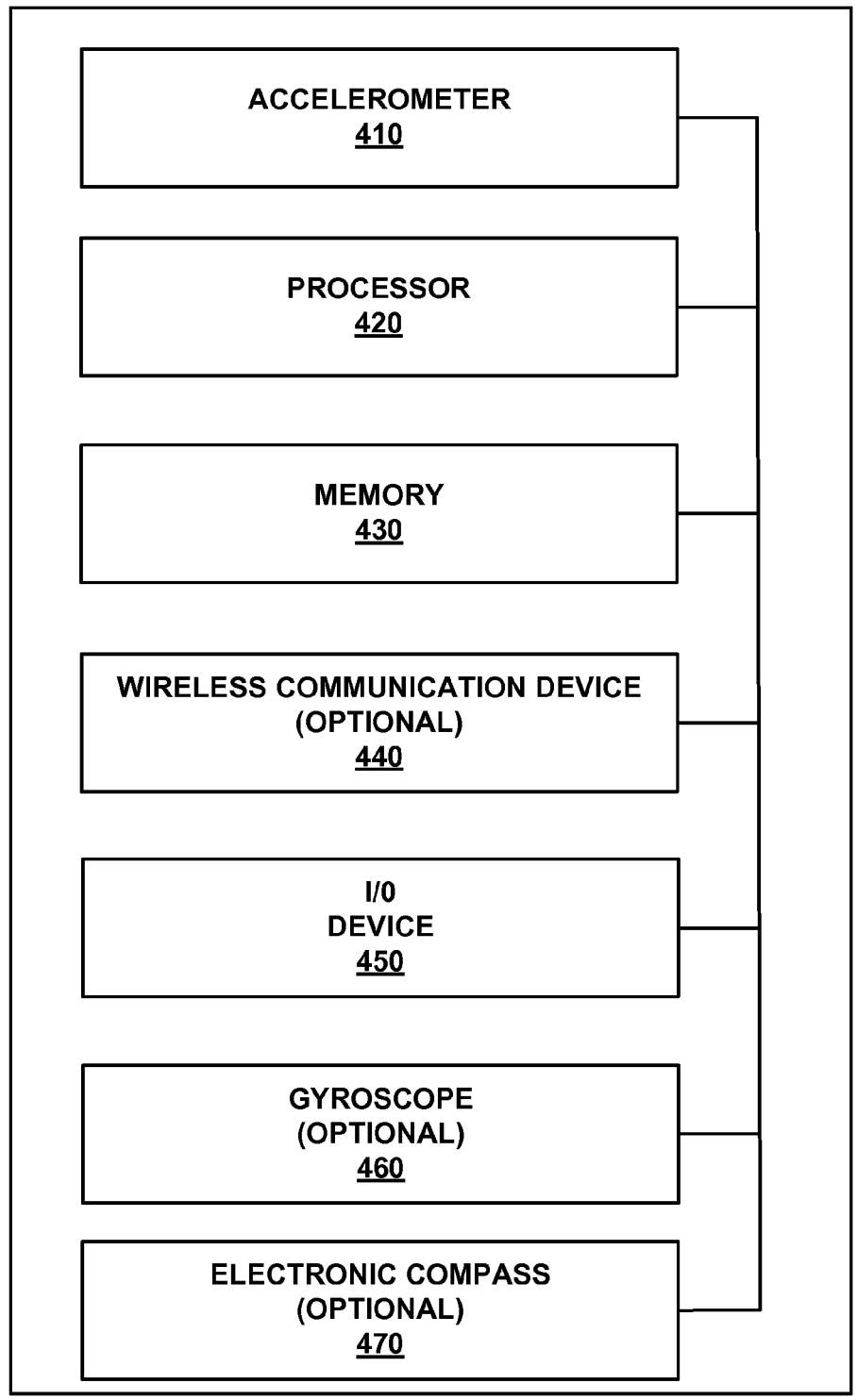
FIG. 4 is a block diagram of an example of an inertial movement sensor in accordance with various embodiments.
Figure 5:
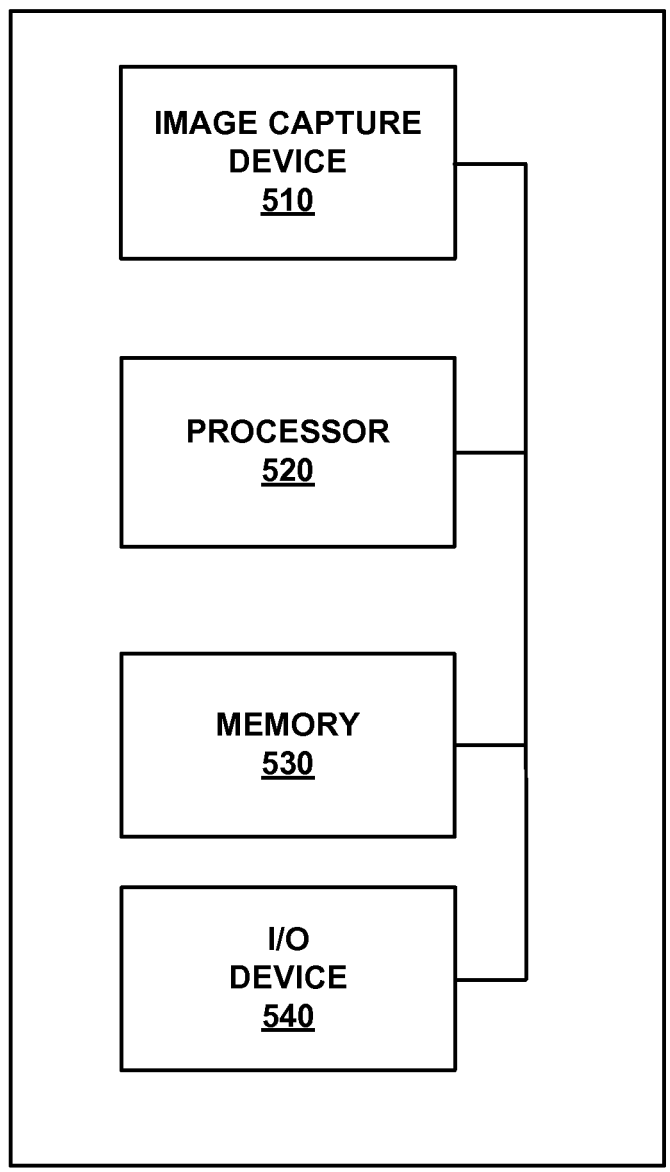
FIG. 5 is a block diagram of an example of an image-based movement sensor in accordance with various embodiments.

In accordance with various embodiments, upon restarting, processor 130 (e.g., processor(s) 130A-130C of FIG. 3, navigation processor 258 of FIG. 2, processor 420 of FIG. 4, and/or 520 of FIG. 5) is configured to determine whether a net movement of antenna 232 of GNSS receiver 110 has occurred since shut down using information from movement sensor 120 and whether that net movement exceeds a threshold net movement parameter which is typically the size of the expected precision of the GNSS sensor (e.g. 2 cm for high precision sensors, or 10 cm or more for less advanced applications). If the net movement of antenna 232 exceeds that threshold net movement parameter while GNSS receiver 110 is shut down, a long convergence algorithm (e.g., 112 of FIG. 1) is initiated when GNSS receiver 110 is subsequently powered up. If the net movement of the antenna 232 of GNSS receiver 110 does not exceed the threshold net movement parameter while GNSS receiver 110 is shut down, a short convergence algorithm (e.g., 111 of FIG. 1) is initiated when GNSS receiver 110 is subsequently powered up. In one embodiment, movement sensor 120 is simply configured to monitor and report movement (e.g., acceleration) and that information is stored at a separate device (e.g., volatile memory 311 of FIG. 3, or storage 260 of FIG. 2). Alternatively, movement sensor 120 comprises a sensor dedicated to movement sensing and reporting component (e.g., 400 or 500 of FIGS. 4 and 5 respectively) and may comprise a processor (e.g., processors 420 or 520 of FIGS. 4 and 5 respectively) and is configured with a memory/data storage device (e.g., 430 and 530 of FIGS. 4 and 5 respectively) to store and report movement including movement of GNSS receiver 110 and/or antenna 232 when GNSS receiver 110 is shut down. One example of such as device is a telematics box as is described below with reference to FIG. 3. In another embodiment, movement sensor 120 may be integrated into a device comprising GNSS receiver 110 and can additionally comprise processor 130. In accordance with another embodiment, processor 130 comprises a component (e.g., navigation processor 258 of FIG. 2) of GNSS receiver 110. In accordance with at least one embodiment, antenna 232 comprises a component of GNSS receiver 110 as shown in FIG. 2. Finally, in at least one embodiment GNSS receiver 110, antenna 232, movement sensor 120, and processor 130 are separate components, or sub-components of separate systems, disposed in a mobile machine such as an automobile, agricultural vehicle (e.g., 600 of FIG. 6), construction vehicle, or autonomously operated vehicle. In accordance with various embodiments, movement sensor 120 is configured to detect the movement of a mobile machine (e.g., agricultural vehicle 600 of FIG. 6) with which GNSS receiver 110 and antenna 232 is coupled. Thus, by detecting movement of agricultural vehicle 600, movement sensor 120 also detects movement of antenna 232. It is noted that movement of agricultural vehicle 600 may comprise tilting rather than a displacement of agricultural vehicle 600 from one location to another. However, a tilting of agricultural vehicle 600 could result in a net movement of antenna 232 such that its net movement exceeds a threshold net movement parameter and a long convergence algorithm is selected.

Additionally, there are various modes of monitoring movement of a mobile machine comprising GNSS receiver 110 and antenna 232. In one embodiment, movement sensor 120 continuously monitors movement, including the net movement of the mobile machine. This can include storing indications of movement, or lack thereof, periodically, or storing indications of movement when they are detected. Alternatively, movement sensor 120 can detect and store a first position when GNSS receiver 110 is being shut down and detect whether any movement has occurred before GNSS receiver 110 is subsequently powered up. In another embodiment, processor 130 can generate a query to movement sensor 120 to determine whether movement of antenna 232 has occurred after GNSS receiver 110 has been shut down. This determination of net movement can comprise accessing a memory which receives indication of movement from movement sensor 120 and has stored any indications of movement, including net movement, which were detected by movement sensor 120 after GNSS receiver 110 has been shut down. Alternatively, processor 130 can generate a query which causes a comparison of the position of antenna 232 prior to shut down of GNSS receiver 110 with the position of antenna 232 subsequent to powering up GNSS receiver 110.

It is noted that many mobile machines are already configured with movement sensor(s) 120 which can be integrated into convergence selection system 100. For example, many types of construction equipment such as cranes, bulldozers, graders, etc. are already configured with movement sensors which can be used in accordance with various embodiments. As an example, many cranes are configured with accelerometers to determine the location and movement of components such as the boom of the crane. In another example, many bulldozers and/or graders are configured with accelerometers to determine the working end of an implement such as a blade. In accordance with various embodiments, these components can be integrated with convergence selection system 100 via the Controller Area Network (CAN) bus of that vehicle to provide data which indicates whether the net movement of antenna 232 exceeds a threshold net movement parameter after GNSS receiver 110 has been shut down. It is further noted that the threshold net movement parameter can simply be any net movement of a mobile machine with which GNSS receiver 110 and antenna 232 are coupled, or may comprise a pre-determined distance such as a net movement of approximately 2 cm for high precision sensors, or 10 cm or more for less advanced applications. Furthermore, this may be a user determined distance, or a factory pre-set parameter.

Global Navigation Satellite Systems

A Global Navigation Satellite System (GNSS) is a navigation system that makes use of a constellation of satellites orbiting the earth to provide signals to a receiver, such as GNSS receiver 110 of FIG. 2, which estimates its position relative to the earth from those signals. Examples of such satellite systems are the NAVSTAR Global Positioning System (GPS) deployed and maintained by the United States, the GLObal NAvigation Satellite System (GLONASS) deployed by the Soviet Union and maintained by the Russian Federation, and the GALILEO system currently being deployed by the European Union (EU).

Each GPS satellite transmits continuously using two radio frequencies in the L-band, referred to as L1 and L2, at respective frequencies of 1575.41 MHz and 1227.60 MHz. Two signals are transmitted on L1, one for civil users and the other for users authorized by the United States Department of Defense (DoD). One signal is transmitted on L2, intended only for DoD-authorized users. Each GPS signal has a carrier at the L1 and L2 frequencies, a pseudo random number (PRN) code, and satellite navigation data. Recently, a second civilian GPS signal, the L2C signal, has been added to provide greater precision in determining positions in commercial applications. Like the L2 signal, the L2C is also broadcast in the 1227.60 MHz frequency band. As a result, civilian users having dual-frequency GNSS receivers can benefit from faster acquisition, enhanced reliability, greater operating range, and greater precision.

Two different PRN (Pseudo Random Number) codes are transmitted by each satellite: A coarse acquisition (C/A) code and a precision (P/Y) code which is encrypted for use by authorized users. A receiver, such as GNSS receiver 110, designed for precision positioning contains multiple channels, each of which can track the signals on either L1 and L2 frequencies from a GPS satellite in view above the horizon at the receiver antenna, and, from these, computes the observables for that satellite comprising the L1 pseudorange, possibly the L2/L2C pseudorange and the coherent L1 and L2/L2C carrier phases. Coherent phase tracking implies that the carrier phases from two channels assigned to the same satellite and frequency will differ only by an integer number of cycles. It is noted that in accordance with various embodiments, continuous tracking of the L2/L2C signal is not necessary.

Each GLONASS satellite conventionally transmits continuously using two radio frequency bands in the L-band, also referred to as L1 and L2 bands. Each satellite transmits on one of multiple frequencies within the L1 and L2 bands respectively centered at frequencies of 1602.0 MHz and 1246.0 MHz respectively. The code and carrier signal structure is similar to that of NAVSTAR. A GNSS receiver designed for precision positioning contains multiple channels each of which can track the signals from both GPS and GLONASS satellites on their respective L1, L2/L2C frequencies, and generate pseudorange and carrier phase observables from these. Future generations of GNSS receivers will include the ability to track signals from all deployed GNSSs. It should be noted that in the near future a modernized L1 Glonass signal will be added that is centered at 1575.42 MHz, the same center frequency as L1 GPS. Additionally, this modernized Glonass signal will be in a code division multiple access (CDMA) format rather than in a frequency division multiple access (FDMA) like its conventional counterpart that is centered at approximately 1602.0 MHz.

Differential Global Positioning System (DGPS)

Differential GPS (DGPS) utilizes a reference station which is located at a surveyed position to gather data and deduce corrections for the various error contributions which reduce the precision of determining a position fix. For example, as the GPS signals pass through the ionosphere and troposphere, propagation delays may occur. Other factors which may reduce the precision of determining a position fix may include satellite clock errors, GPS receiver clock errors, and satellite position errors (ephemerides). The reference station receives essentially the same GPS signals as GNSS receiver 110 which may also be operating in the area. However, instead of using the timing signals from the GPS satellites to calculate its position, it uses its known position to calculate timing. In other words, the reference station determines what the timing signals from the GPS satellites should be in order to calculate its actual known position. The difference in timing can be expressed in terms of pseudorange lengths, in meters. The difference between the received GPS signals and what they optimally should be is used as an error correction factor for other GPS receivers in the area. Typically, the reference station broadcasts the error correction to, for example, a rover unit which can use this data to determine its position more precisely. Alternatively, the error corrections may be stored for later retrieval and correction via post-processing techniques.

DGPS corrections cover errors caused by satellite clocks, ephemeris, and the atmosphere in the form of ionosphere errors and troposphere errors. The nearer a DGPS reference station is to the rover unit receiving the broadcast error correction the more useful the DGPS corrections from that reference station will be.

The system is called DGPS when GPS is the only constellation used for Differential GNSS. DGPS provides an accuracy on the order of 1 meter (1 sigma) for users in a range that is approximately in a few tens of kilometers (kms) from the reference station and growing at the rate of 1 m per 150 km of separation. DGPS is one type of Differential GNSS (DGNSS) technique. There are other types of DGNSS techniques, such as RTK and Wide Area RTK (WARTK), that can be used by high-precision applications for navigation or surveying that can be based on using carrier phase measurements. It should be appreciated that other DGNSS which may utilize signals from other constellations besides the GPS constellation or from combinations of constellations. Embodiments described herein may be employed with other DGNSS techniques besides DGPS.

A variety of different techniques may be used to deliver differential corrections that are used for DGNSS techniques. In one example, DGNSS corrections are broadcast over an FM subcarrier. U.S. Pat. No. 5,477,228 by Tiwari et al. describes a system for delivering differential corrections via FM subcarrier broadcast method.

Real-Time Kinematic System

An improvement to DGPS methods is referred to as Real-time Kinematic (RTK). As in the DGPS method, the RTK method, utilizes a reference station located at a determined or surveyed point. The reference station collects data from the same set of satellites in view by the GNSS receiver 110 in the area. Measurements of GPS signal errors taken at the reference station (e.g., dual-frequency code and carrier phase signal errors) and broadcast to one or more GNSS receiver(s) 110 working in the area. The one or more GNSS receiver(s) 110 combine the reference station data with locally collected position measurements to estimate local carrier-phase ambiguities, thus allowing a more precise determination of the position of GNSS receiver 110. The RTK method is different from DGPS methods in that the vector from a reference station to one of GNSS receiver(s) 110 is determined (e.g., using the double differences method). In DGPS methods, reference stations are used to calculate the changes needed in each pseudorange for a given satellite in view of the reference station, and the GNSS receiver 110, to correct for the various error contributions. Thus, DGPS systems broadcast pseudorange correction numbers second-by-second for each satellite in view, or store the data for later retrieval as described above.

RTK allows surveyors to determine a true surveyed data point in real time, while taking the data. However, the range of useful corrections with a single reference station is typically limited to about 70 km because the variables in propagation delay (increase in apparent path length from satellite to a receiver of the GNSS receiver 110, or pseudo range) increase beyond commercial viability for separation distances beyond 70 km. This is because the ionosphere is typically not homogeneous in its density of electrons, and because the electron density may change based on, for example, the sun's position and, therefore, time of day.

Thus for surveying or other positioning systems which must work over larger regions, the surveyor must either place additional base stations in the regions of interest, or move his base stations from place to place. This range limitation has led to the development of more complex enhancements that have superseded the normal RTK operations described above, and in some cases eliminated the need for a local base station GPS receiver altogether. This enhancement is referred to as the "Network RTK" or "Virtual Reference Station" (VRS) system and method.

Network RTK

Network RTK typically uses three or more GPS reference stations to collect GPS data and extract information about the atmospheric and satellite ephemeris errors affecting signals within the network coverage region. Data from all the various reference stations is transmitted to a central processing facility, or control center for Network RTK. Suitable software at the control center processes the reference station data to infer how atmospheric and/or satellite ephemeris errors vary over the region covered by the network.

The control center computer processor then applies a process which interpolates the atmospheric and/or satellite ephemeris errors at any given point within the network coverage area and generates a pseudo range correction comprising the estimated pseudo ranges that can be used to create a virtual reference station. The control center then performs a series of calculations and creates a set of correction models that provide the GNSS receiver 110 with the means to estimate the ionospheric path delay from each satellite in view from GNSS receiver 110, and to take account other error contributions for those same satellites at the current instant in time for the GNSS receiver 110's location.

These corrections are now sufficiently precise that the high performance position accuracy standard of 2-3 cm may be determined, in real time, for any arbitrary GNSS receiver 110's position. Thus a GPS enabled GNSS receiver 110's raw GPS data fix can be corrected to a degree that makes it behave as if it were a surveyed reference location; hence the terminology "virtual reference station."

An example of a network RTK system is described in U.S. Pat. No. 5,899,957, entitled "Carrier Phase Differential GPS Corrections Network," by Peter Loomis, assigned to the assignee of the present application.

The Virtual Reference Station method extends the allowable distance from any reference station to the GNSS receiver 110. Reference stations may now be located hundreds of miles apart, and corrections can be generated for any point within an area surrounded by reference stations. However, there are many construction projects and agricultural areas where cellular coverage is not available over the entire physical area being worked or surveyed.

Virtual Reference Stations

To achieve very accurate positioning (to several centimeters or less) of a terrestrial mobile platform of a GNSS receiver 110, relative or differential positioning methods are commonly employed. These methods use a GNSS reference receiver located at a known position, in addition to the data from a GNSS receiver 110 on a mobile platform, to compute the estimated position of the mobile platform relative to the reference receiver.

The most accurate known method uses relative GNSS carrier phase interferometry between the GNSS receiver 110's receiver and GNSS reference receiver antennas plus resolution of integer wavelength ambiguities in the differential phases to achieve sub-centimeter-level positioning accuracies. These differential GNSS methods are predicated on the near exact correlation of several common errors in the GNSS receiver 110 and reference observables. They include ionosphere and troposphere signal delay errors, satellite orbit and clock errors, and receiver clock errors.

When the baseline length between the mobile platform (e.g., GNSS receiver 110) and the reference receiver does not exceed 10 kilometers, which is normally considered a short baseline condition, the ionosphere and troposphere signal delay errors in the observables from the GNSS receiver 110 and reference receivers are almost exactly the same. These atmospheric delay errors therefore cancel in the GNSS receiver 110's reference differential GNSS observables, and the carrier phase ambiguity resolution process required for achieving centimeter-level relative positioning accuracy is not perturbed by them. If the baseline length increases beyond 10 kilometers (considered a long baseline condition), these errors at the GNSS receiver 110 and reference receiver antennas become increasingly different, so that their presence in the GNSS receiver 110's reference differential GNSS observables and their influence on the ambiguity resolution process increases. Ambiguity resolution on single GNSS receiver 110's reference receiver baselines beyond 10 kilometers becomes increasingly unreliable. This attribute limits the precise resolution of a mobile platform with respect to a single reference receiver, and essentially makes it unusable on a mobile mapping platform that covers large distances as part of its mission, such as a sparsely populated area.

A network GNSS method computes the estimated position of a GNSS receiver 110's antenna(s) (e.g., 232 of FIG. 2) using reference observables from three or more reference receivers that approximately surround the GNSS receiver 110's receiver trajectory. This implies that the GNSS receiver 110's receiver trajectory is mostly contained by a closed polygon whose vertices are the reference receiver antennas. The GNSS receiver 110 can move a few kilometers outside this polygon without significant loss of positioning accuracy. A network GNSS algorithm calibrates the ionosphere and troposphere signal delays at each reference receiver position and then interpolates and possibly extrapolates these to the GNSS receiver 110's position to achieve better signal delay cancellation on long baselines than could be had with a single reference receiver. Various methods of signal processing can be used, however they all yield essentially the same performance improvement on long baselines.

Kinematic ambiguity resolution (KAR) satellite navigation is a technique used in numerous applications requiring high position accuracy. KAR is based on the use of carrier phase measurements of satellite positioning system signals, where a single reference station provides the real-time corrections with high accuracy. KAR combines the L1 and L2/L2C carrier phases from the GNSS receiver 110 and reference receivers so as to establish a relative phase interferometry position of the GNSS receiver 110's antenna with respect to the reference antenna. A coherent L1 or L2/L2C carrier phase observable can be represented as a precise pseudorange scaled by the carrier wavelength and biased by an integer number of unknown cycles known as cycle ambiguities. Differential combinations of carrier phases from the GNSS receiver 110 and reference receivers result in the cancellation of all common mode range errors except the integer ambiguities. An ambiguity resolution algorithm uses redundant carrier phase observables from the GNSS receiver 110 and reference receivers, and the known reference antenna position, to estimate and thereby resolve these ambiguities.

Once the integer cycle ambiguities are known, the GNSS receiver 110 can compute its antenna position with accuracies generally on the order of a few centimeters, provided that the GNSS receiver 110 and reference antennas are not separated by more than 10 kilometers. This method of precise positioning performed in real-time is commonly referred to as real-time kinematic (RTK) positioning.

The reason for the device-reference separation constraint is that KAR positioning relies on near exact correlation of atmospheric signal delay errors between the GNSS receiver 110 and reference receiver observables, so that they cancel in the GNSS receiver 110's reference observables combinations (for example, differences between GNSS receiver 110 and reference observables per satellite). The largest error in carrier-phase positioning solutions is introduced by the ionosphere, a layer of charged gases surrounding the earth. When the signals radiated from the satellites penetrate the ionosphere on their way to the ground-based receivers, they experience delays in their signal travel times and shifts in their carrier phases. A second significant source of error is the troposphere delay. When the signals radiated from the satellites penetrate the troposphere on their way to the ground-based receivers, they experience delays in their signal travel times that are dependent on the temperature, pressure and humidity of the atmosphere along the signal paths. Fast and reliable positioning requires good models of the spatio-temporal correlations of the ionosphere and troposphere to correct for these non-geometric influences.

The GNSS receiver 110's reference separation constraint has made KAR positioning with a single reference receiver unsuitable for certain mobile positioning applications where the mission of the mobile platform of the GNSS receiver 110 will typically exceed this constraint. One solution is to set up multiple reference receivers along the mobile platform's path so that at least one reference receiver falls within a 10 km radius of the mobile platform's estimated position.

Network GNSS methods using multiple reference stations of known location allow correction terms to be extracted from the signal measurements. Those corrections can be interpolated to all locations within the network. Network KAR is a technique that can achieve centimeter-level positioning accuracy on large project areas using a network of reference GNSS receivers. This technique operated in real-time is commonly referred to as network RTK. The network KAR algorithm combines the pseudorange and carrier phase observables from the reference receivers as well as their known positions to compute calibrated spatial and temporal models of the ionosphere and troposphere signal delays over the project area. These calibrated models provide corrections to the observables from the GNSS receiver 110's receiver, so that the GNSS receiver 110 can perform reliable ambiguity resolution on combinations of carrier phase observables from the GNSS receiver 110 and some or all reference receivers. The number of reference receivers required to instrument a large project area is significantly less than what would be required to compute reliable single baseline KAR solutions at any point in the project area. See, for example, U.S. Pat. No. 5,477,458, "Network for Carrier Phase Differential GPS Corrections," and U.S. Pat. No. 5,899,957, "Carrier Phase Differential GPS Corrections Network". See also Liwen Dai et al., "Comparison of Interpolation Algorithms in Network-Based GPS Techniques," Journal of the Institute of Navigation, Vol. 50, No. 4 (Winter 1003-1004) for a comparison of different network GNSS implementations and comparisons of their respective performances.

A virtual reference station (VRS) network method is a particular implementation of a network GNSS method that is characterized by the method by which it computes corrective data for the purpose of GNSS receiver 110's position accuracy improvement. A VRS network method comprises a VRS corrections generator and a single-baseline differential GNSS position generator with differential GNSS capability. The VRS corrections generator has as input data the pseudorange and carrier phase observables on two or more frequencies from N reference receivers, each tracking signals from M GNSS satellites. The VRS corrections generator outputs a single set of M pseudorange and carrier phase observables that appear to originate from a virtual reference receiver at a specified position (hereafter called the VRS position) within the boundaries of the network defined by a polygon (or projected polygon) having all or some of the N reference receivers as vertices. The dominant observables errors comprising a receiver clock error, satellite clock errors, ionosphere and troposphere signal delay errors and noise all appear to be consistent with the VRS position. The single-baseline differential GNSS position generator implements a single-baseline differential GNSS position algorithm, of which numerous examples have been described in the literature. B. Hofmann-Wellenhof et al., Global Positioning System: Theory and Practice, 5th Edition, 1001 (hereinafter "Hofmann-Wellenhof [1001]"), gives comprehensive descriptions of different methods of differential GNSS position computation, ranging in accuracies from one meter to a few centimeters. The single-baseline differential GNSS position algorithm typically computes differences between the GNSS receiver 110 and reference receiver observables to cancel atmospheric delay errors and other common mode errors such as orbital and satellite clock errors. The VRS position is usually specified to be close to or the same as the roving receiver's estimated position so that the actual atmospheric errors in the GNSS receiver 110 receiver observables approximately cancel the estimated atmospheric errors in the VRS observables in the rovers reference observables differences.

The VRS corrections generator computes the synthetic observables at each sampling epoch (typically once per second) from the geometric ranges between the VRS position and the M satellite positions as computed using well-known algorithms such as those given in IS-GPS-200G interface specification tilted "Navstar GPS Space Segment/Navigation User Interfaces," and dated 5 Sep. 2012. It estimates the typical pseudorange and phase errors comprising receiver clock error, satellite clock errors, ionospheric and tropospheric signal delay errors and noise, applicable at the VRS position from the N sets of M observables generated by the reference receivers, and adds these to the synthetic observables.

A network RTK system operated in real time requires each GNSS reference receiver to transmit its observables to a network server computer that computes and transmits the corrections and other relevant data to the GNSS receiver 110's receiver. The GNSS reference receivers, plus hardware to assemble and broadcast observables, are typically designed for this purpose and are installed specifically for the purpose of implementing the network. Consequently, those receivers are called dedicated (network) reference receivers.

An example of a VRS network is designed and manufactured by Trimble Navigation Limited, of Sunnyvale, Calif. The VRS network as delivered by Trimble includes a number of dedicated reference stations, a VRS server, multiple server-reference receiver bi-directional communication channels, and multiple server-cellular-device-bi-directional data communication channels. Each server-cellular device bi-directional communication channel serves one GNSS receiver 110. The reference stations provide their observables to the VRS server via the server-reference receiver bi-directional communication channels. These channels can be implemented by a public network such as the Internet. The bi-directional server-cellular-device communication channels can be radio modems or cellular telephone links, depending on the location of the server with respect to the GNSS receiver 110.

The VRS server combines the observables from the dedicated reference receivers to compute a set of synthetic observables at the VRS position and broadcasts these plus the VRS position in a standard differential GNSS (DGNSS) message format, such as one of the RTCM (Radio Technical Commission for Maritime Services) formats, an RTCA (Radio Technical Commission for Aeronautics) format or a proprietary format such as the CMR (Compact Measurement Report) or CMR+ format which are messaging system communication formats employed by Trimble Navigation Limited. Descriptions for numerous of such formats are widely available. For example, RTCM Standard 10403.1 for DGNSS Services—Version 3, published Oct. 26, 2006 (and Amendment 2 to the same, published Aug. 31, 2007) is available from the Radio Technical Commission for Maritime Services, 1800 N. Kent St., Suite 1060, Arlington, Va., 22209. The synthetic observables are the observables that a reference receiver located at the VRS position would measure. The VRS position is selected to be close to the GNSS receiver 110's estimated position so that the GNSS receiver 110's VRS separation is less than a maximum separation considered acceptable for the application. Consequently, the GNSS receiver 110 must periodically transmit its approximate position to the VRS server. The main reason for this particular implementation of a real-time network RTK system is compatibility with RTK survey GNSS receivers that are designed to operate with a single reference receiver.

Descriptions of the VRS technique are provided in U.S. Pat. No. 6,324,473 of (hereinafter "Eschenbach") (see particularly col. 7, line 21 et seq.) and U.S. Patent application publication no. 2005/0064878, of B. O'Meagher (hereinafter "O'Meagher"), which are assigned to Trimble Navigation Limited, of Sunnyvale, Calif.; and in H. Landau et al., Virtual Reference Stations versus Broadcast Solutions in Network RTK, GNSS 2003 Proceedings, Graz, Austria (2003).

The term "VRS", as used henceforth in this document, is used as shorthand to refer to any system or technique which has the characteristics and functionality of VRS described or referenced herein and is not necessarily limited to a system from Trimble Navigation Ltd. Hence, the term "VRS" is used in this document merely to facilitate description and is used without derogation to any trademark rights of Trimble Navigation Ltd. or any subsidiary thereof or other related entity.

Precise Point Positioning (PPP)

Descriptions of a Precise Point Positioning (PPP) technique are provided in U.S. Pat. No. 8,587,475, of Leandro, which is assigned to Trimble Navigation Limited, of Sunnyvale, Calif. Trimble Navigation Limited has commercialized a version of PPP corrections which it calls RTX™. PPP corrections can be any collection of data that provides corrections from a satellite in space, clock errors, ionosphere or troposphere, or a combination thereof. According to one embodiment, PPP corrections can be used in instead of WAAS or RTX™.

The term Precise Point Positioning (PPP), as used henceforth in this document, is used as shorthand to refer to any system or technique which has the characteristics and functionality of PPP described or referenced herein and is not necessarily limited to a system from Trimble Navigation Limited, of Sunnyvale, Calif. Hence, the term "PPP" is used in this document merely to facilitate description and is used without derogation to any trademark rights of Trimble Navigation Limited. or any subsidiary thereof or other related entity. Techniques for generating PPP corrections are well known in the art. In general, a PPP system utilizes a network (which may be global) of GNSS reference receivers tracking navigation satellites such as GPS and GLONASS satellites and feeding data back to a centralized location for processing. At the centralized location, the precise orbits and precise clocks of all of the tracked navigation satellites are generated and updated in real time. A correction stream is produced by the central location; the correction stream contains the orbit and clock information. This correction stream is broadcast or otherwise provided to GNSS receivers, such as a GNSS receiver 110, in the field (conventionally by satellite service or cellular link, but be done by any of a number of communications links). Corrections processors in the GNSS receivers utilize the corrections to produce centimeter level positions after a short convergence time (e.g., less than 30 minutes). A main difference between PPP and VRS is that PPP networks of reference receivers are typically global while VRS networks may be regional or localized with shorter spacing between the reference stations in a VRS network.

Wide Area Augmentation System (WAAS)

Wide Area Augmentation System (WAAS) corrections are corrections of satellite position and their behavior. WAAS was developed by the Federal Aviation Administration (FAA). WAAS includes a network of reference stations that are on the ground located in North America and Hawaii. The reference stations transmit their respective measurements to master stations which queue their respective received measurements. The master stations transmit WAAS corrections to geostationary WAAS satellites, which in turn broadcast the WAAS corrections back to earth where cellular devices that include WAAS-enabled GPS receivers can receive the broadcasted WAAS corrections. According to one embodiment, the GNSS receiver 110 is a WAAS-enabled GPS receiver. The WAAS corrections can be used to improve the accuracy of the positions of receiver such as GNSS receiver 110, for example, by applying the WAAS corrections to extracted pseudoranges. WAAS operation and implementation is well known in the art.

Example GNSS Receiver

With reference now to FIG. 2, a block diagram is shown of an embodiment of an example GNSS receiver 110 which may be used in accordance with various embodiments described herein. In particular, FIG. 2 illustrates a block diagram of a GNSS receiver 110 in the form of a general purpose GPS capable of demodulation of the L1 and/or L2/L2C signal(s) received from one or more GPS satellites. A more detailed discussion of the function of a receiver such as GNSS receiver 110 can be found in U.S. Pat. No. 5,621,416, by Gary R. Lennen, is titled "Optimized processing of signals for enhanced cross-correlation in a satellite positioning system receiver," and includes a GPS receiver very similar to GNSS receiver 110 of FIG. 2. It is noted that in the embodiment shown in FIG. 2, antenna 232 is disposed within a housing of GNSS receiver 110.

In FIG. 2, received L1 and L2/L2C signals are generated by at least one GPS satellite. Each GPS satellite generates different signal L1 and L2/L2C signals and they are processed by different digital channel processors 252 which operate in the same way as one another. FIG. 2 shows GPS signals (L1=1575.42 MHz, L2/L2C=1227.60 MHz) entering GNSS receiver 110 through a dual frequency antenna 232. Antenna 232 may, for example, be a magnetically mountable model commercially available from Trimble Navigation Limited, of Sunnyvale, Calif. Master oscillator 248 provides the reference oscillator which drives all other clocks in the system. Frequency synthesizer 238 takes the output of master oscillator 248 and generates important clock and local oscillator frequencies used throughout the system. For example, in one embodiment, frequency synthesizer 238 generates several timing signals such as a 1st (local oscillator) signal LO1 at 1400 MHz, a 2nd local oscillator signal LO2 at 175 MHz, an SCLK (sampling clock) signal at 25 MHz, and a MSEC (millisecond) signal used by the system as a measurement of local reference time.

A filter/LNA (Low Noise Amplifier) 234 performs filtering and low noise amplification of both L1 and L2/L2C signals. The noise figure of GNSS receiver 110 is dictated by the performance of the filter/LNA combination. The downconvertor 236 mixes both L1 and L2/L2C signals in frequency down to approximately 175 MHz and outputs the analog L1 and L2/L2C signals into an IF (intermediate frequency) processor 250. IF processor 250 takes the analog L1 and L2/L2C signals at approximately 175 MHz and converts them into digitally sampled L1 and L2/L2C in-phase (L1 I and L2/L2C I) and quadrature signals (L1 Q and L2/L2C Q) at carrier frequencies 420 KHz for L1 and at 2.6 MHz for L2/L2C signals respectively.

At least one digital channel processor 252 inputs the digitally sampled L1 and L2/L2C in-phase and quadrature signals. All digital channel processors 252 are typically identical by design and typically operate on identical input samples. Each digital channel processor 252 is designed to digitally track the L1 and L2/L2C signals produced by one satellite by tracking code and carrier signals and to form code and carrier phase measurements in conjunction with the GNSS microprocessor system 254. One digital channel processor 252 is capable of tracking one satellite in both L1 and L2/L2C channels. GNSS microprocessor system 254 is a general purpose computing device which facilitates tracking and measurements processes, providing pseudorange and carrier phase measurements for navigation processor 258. In one embodiment, GNSS microprocessor system 254 provides signals to control the operation of one or more digital channel processors 252. According to one embodiment, the GNSS microprocessor system 254 provides one or more of pseudorange information 272, Doppler Shift information 274, and real Carrier Phase Information 276 to the navigation processor 258. One or more of pseudorange information 272, Doppler Shift information 274, and real Carrier Phase Information 276 (e.g., short convergence algorithm 111 and long convergence algorithm 112) can also be obtained from storage 260. Alternatively, information can be obtained from outside of GNSS receiver 110 such as from computer system 300 of FIG. 3. One or more of the signals 272, 274, and 276 can also be conveyed to an external device's processor. In accordance with various embodiments, GNSS microprocessor system 254 is configured to output a position fix 284 to a device outside of GNSS receiver 110. Additionally, GNSS microprocessor system 254 can output a position, velocity, time (PVT) solution to a device outside of GNSS receiver 110. Navigation processor 258 which performs the higher level function of combining measurements in such a way as to produce position, velocity and time information for the differential and surveying functions, for example, in the form of a position fix 280. Storage 260 is coupled with navigation processor 258 and GNSS microprocessor system 254. It is appreciated that storage 260 may comprise a volatile or non-volatile storage such as a RAM or ROM, or some other computer readable memory device or media. In some embodiments, navigation processor 258 performs one or more of the methods of position correction described herein including implementing short convergence algorithm 111 and long convergence algorithm 112.

In some embodiments, GNSS microprocessor system 254 and/or navigation processor 258 receive additional inputs for use in receiving correction information (e.g., 282). According to one embodiment, an example of the correction information is WAAS corrections. According to one embodiment, examples of correction information are differential GPS corrections, RTK corrections, signals used by the Enge-Talbot method, EGNOS corrections, and wide area augmentation system (WAAS) corrections among others.

Although FIG. 2 depicts a GNSS receiver 110 with navigation signals L1I, L1Q, L2/L2CI, L2/L2CQ, various embodiments are well suited different combinations of navigational signals. For example, according to one embodiment, the GNSS receiver 110 may only have an L1I navigational signal. According to one embodiment, the GNSS receiver 110 may only have L1I, L1Q and L2/L2CI. In other embodiments, GNSS receiver 110 may use other combinations of navigation signals such as, but not limited to: an L1 signal, an L1 and L2/L2C signal, and an L1I and L1Q signal.

Example Computer System

With reference now to FIG. 3, all or portions of some embodiments described herein are composed of computer-readable and computer-executable instructions that reside, for example, in non-transitory computer-usable/computer-readable storage media of a computer system. That is, FIG. 3 illustrates one example of a type of computer (computer system 300) that can be used in accordance with or to implement various embodiments which are discussed herein. It is appreciated that computer system 300 of FIG. 3 is only an example and that embodiments as described herein can operate on or within a number of different computer systems including, but not limited to, embedded computer systems, server devices, various intermediate devices/nodes, vehicular navigation systems, handheld computer systems, telematics boxes, and the like. Computer system 300 of FIG. 3 is well adapted to having peripheral computer-readable storage media 302 such as, for example, a floppy disk, a compact disc, digital versatile disc, universal serial bus "thumb" drive, removable memory card, and the like coupled thereto. In accordance with at least one embodiment, computer system 300 is implemented as a vehicle navigation/vehicle control system, also referred to as a "telemetry box" in some instances, as may be found in mobile machines such as automobiles, agricultural equipment, construction equipment, or even autonomously operated vehicles. A commercial example is the DCM-300 offered by Trimble Navigation Limited, of Sunnyvale, Calif.

Computer system 300 of FIG. 3 includes an address/data bus 305 for communicating information, and a processor 130A coupled to bus 305 for processing information and instructions. As depicted in FIG. 3, computer system 300 is also well suited to a multi-processor environment in which a plurality of processors 130A, 130B, and 130C are present. Conversely, computer system 300 is also well suited to having a single processor such as, for example, processor 130A. Processors 130A, 130B, and 130C may be any of various types of microprocessors. Computer system 300 also includes data storage features such as a computer usable volatile memory 311, e.g., random access memory (RAM), coupled to bus 305 for storing information and instructions for processors 130A, 130B, and 130C. Computer system 300 also includes computer usable non-volatile memory 310, e.g., read only memory (ROM), coupled to bus 305 for storing static information and instructions for processors 130A, 130B, and 130C. Also present in computer system 300 is an optional data storage unit 312 (e.g., a magnetic or optical disk and disk drive) coupled to bus 305 for storing information and instructions. Computer system 300 also includes an optional alphanumeric input device 314 including alphanumeric and function keys coupled to bus 305 for communicating information and command selections to processor 130A or processors 130A, 130B, and 130C. In one embodiment, computer system 300 also includes an optional display device 318 coupled to bus 305 for displaying information. It is noted that in accordance with various embodiments, operations related to convergence selection may be implemented by processor(s) 130A, 130B, and 130C and that short convergence algorithm 111 and long convergence algorithm 112 can be stored in data storage unit 312, data 328, and/or peripheral computer-readable storage media 302.

Referring still to FIG. 3, optional display device 318 of FIG. 3 may be a liquid crystal device, cathode ray tube, plasma display device or other display device suitable for creating graphic images and alphanumeric characters recognizable to a user. A commercial example is the TMX-2050 offered by Trimble Navigation Limited, of Sunnyvale, Calif. In accordance with various embodiments, display device 318 comprises a touch-screen apparatus and alphanumeric input is performed by detecting a user's input via touch gestures. Computer system 300 is also well suited to using other control means such as, for example, voice commands. Computer system 300 also includes an I/O device 321 for coupling computer system 300 with external entities. For example, in one embodiment, I/O device 321 is a modem for enabling wired or wireless communications between computer system 300 and an external network such as, but not limited to, the Internet.

Referring still to FIG. 3, various other components are depicted for computer system 300. Specifically, when present, an operating system 322, applications 324, modules 323, and data 328 are shown as typically residing in one or some combination of computer usable volatile memory 311 (e.g., RAM), computer usable non-volatile memory 310 (e.g., ROM), and data storage unit 312. In some embodiments, all or portions of various embodiments described herein are stored, for example, as an application 324 and/or module 323 in memory locations within RAM 311, computer-readable storage media within data storage unit 312, peripheral computer-readable storage media 302, and/or other tangible computer readable storage media. In the embodiment of FIG. 3, computer system 300 further comprises an optional wireless communication transceiver 319 and an optional movement sensor 320 which are coupled with bus 305.

In accordance with various embodiments, wireless communication transceiver 319 comprises a cellular transceiver coupled with bus 305 for communicating via cellular network (not shown). Examples of cellular networks used by wireless communication transceiver 319 include, but are not limited to Global System for Mobile Communications (GSM) cellular networks, General Packet Radio Service (GPRS) cellular networks, Code Division Multiple Access (CDMA) cellular networks, and Enhanced Data rates for GSM Evolution (EDGE) cellular networks. In accordance with other embodiments, wireless communication transceiver 319 is a radio-frequency transceiver compliant with, but not limited to, Wi-Fi, WiMAX, implementations of the Institute of Electrical and Electronics Engineers (IEEE)

802.11 specification, implementations of the IEEE 802.15.4 specification for personal area networks, and a short range wireless connection operating in the Instrument Scientific and Medical (ISM) band of the radio frequency spectrum in the 2400-2484 MHz range (e.g., implementations of the Bluetooth® standard) including Bluetooth Low Energy (BLE) implementations, implementations of the IEEE 1902.1 (RuBee) specification, implementations of IEEE 802.15 (ZigBee) standard, etc. It is noted that computer system 300 may utilize multiple wireless communication transceivers 319 operable in separate and distinct wireless communication networks. In accordance with various embodiments, movement sensor 320 comprises an accelerometer configured to detect changes in velocity over time. There are a variety of types of accelerometers used in accordance to various embodiments including, but not limited to, capacitive accelerometers, piezo-electric accelerometers, piezo-resistive accelerometers, Hall effect accelerometers, magneto-resistive accelerometers, and micro-electro mechanical system (MEMS) sensors. It is noted that the movement sensor 120 discussed above with reference to FIG. 1 may comprise movement sensor 320, or another device disposed outside of computer system 300 (e.g., movement sensors 400 or 500 of FIGS. 4 and 5 respectively). Many devices configured with a display device (e.g., 318) are also equipped with an accelerometer to determine the orientation of the display device so that data can be displayed properly. A commercial example is the TMX-2050 offered by Trimble Navigation Limited, of Sunnyvale, Calif. In accordance with at least one embodiment, movement sensor 320 comprises an accelerometer originally configured for this purpose.

In FIG. 3, computer system 300 further comprises an input/output (I/O) device(s) 321 which is coupled with bus 305. In accordance with various embodiments, I/O device 321 comprises one or more interfaces with various networked devices. Examples of networks with which I/O device 321 is configured to be coupled with include, but are not limited to, controller area network (CAN) buses used to report data within a vehicle, Ethernet port(s), universal serial bus (USB) ports, and/or special purpose interfaces such as direct connections to various components such as a battery to determine if it has been disconnected, door position switches, seat sensors, ignition switches, fuel pumps, alarms, warning devices, etc.

Computer Readable Storage Medium

Unless otherwise specified, any one or more of the embodiments described herein can be implemented using non-transitory computer readable storage medium and computer readable instructions which reside, for example, in computer-readable storage medium of a computer system or like device. The non-transitory computer readable storage medium can be any kind of physical memory that instructions can be stored on. Examples of the non-transitory computer readable storage medium include but are not limited to a disk, a compact disk (CD), a digital versatile device (DVD), read only memory (ROM), flash, and so on. As described above, certain processes and operations of various embodiments described herein are realized, in some instances, as a series of computer readable instructions (e.g., software program) that reside within non-transitory computer readable storage memory of a GNSS receiver 110 (FIG. 2) and are executed by a hardware processor of the GNSS receiver 110. When executed, the instructions cause a computer system to implement the functionality of various embodiments described herein. For example, the instructions can be executed by a central processing unit associated with the GNSS receiver 110. According to one embodiment, the non-transitory computer readable storage medium is tangible.

Unless otherwise specified, one or more of the various embodiments described herein can be implemented as hardware, such as circuitry, firmware, or computer readable instructions that are stored on non-transitory computer readable storage medium. The computer readable instructions of the various embodiments described herein can be executed by a hardware processor, such as central processing unit, to cause computer system 300 to implement the functionality of various embodiments. For example, according to one embodiment, the processor(s) 130A-130C of FIG. 3 and the operations of the flowchart 700 depicted in FIG. 7 are implemented with computer readable instructions that are stored on computer readable storage medium, which can be tangible or non-transitory or a combination thereof, and can be executed by a hardware processor of a GNSS receiver 110. For example, one embodiment may comprise a non-transitory computer readable storage medium having computer readable instructions stored thereon for causing a computer system (e.g., computer system 300 or other computer system) to perform a method of implementing convergence selection of a GNSS receiver. According to one embodiment, the non-transitory computer readable storage medium is tangible.

Some Examples of Movement Sensors

FIG. 4 is a block diagram of an example movement sensor 400 in accordance with various embodiments. In accordance with various embodiments, movement sensor 400 comprises a self-contained movement sensor (e.g., 120 of FIG. 1) or inertial measurement unit (IMU) which can be used as a theft/tampering detection and reporting device. Thus, movement sensor may be disposed within, or coupled with, a mobile machine further comprising GNSS receiver 110 and can be used to detect movement of that mobile machine, and thus antenna 232, when GNSS receiver 110 is shut down. In FIG. 4, movement sensor 400 comprises an accelerometer 410, a processor 420, a memory 430, an optional wireless communication device 440, an input/output (I/O) device 450, and an optional gyroscope 460 which are coupled with a bus. It is noted that the list of components comprising movement sensor 400 is not meant to be all-encompassing and that other components (e.g., a battery, etc.) have been omitted for the sake of brevity. In accordance with various embodiments, accelerometer 410 may be one of many types of accelerometers including, but not limited to, capacitive accelerometers, piezo-electric accelerometers, piezo-resistive accelerometers, Hall effect accelerometers, magneto-resistive accelerometers, and micro-electro mechanical system (MEMS) sensors. The movement sensor might also be a gyroscope with a jerk detector configured to detect sudden changes in the movement state of mobile machine 600. MEMS gyros are known to drift over time and so an absolute reading would be useless if mobile machine 600 is stationary for more than a few hours. However, a sudden change would indicate a movement of the mobile machine 600. In accordance with various embodiments, accelerometer 410 is capable of detecting acceleration in 6-axes of movement. It is noted that the movement sensor 120 discussed above with reference to FIG. 1 may comprise accelerometer 410 in accordance with at least one embodiment. Processor 420 is for processing information and instructions and may be any of various types of microprocessors. In accordance with at least one embodiment, processor 420 is configured to implement a method of implementing convergence selection of a GNSS receiver as described herein. Alternatively, processor 420 is configured to receive instructions, messages, and queries from another source which cause it to record, or report movement, as detected by accelerometer 410, while GNSS receiver 110 is shut down. Memory 430 is for storing instructions for processor 420 and for storing indications and/or measurements of movement as detected by accelerometer 410.

In accordance with various embodiments, wireless communication device 440 comprises a cellular transceiver for communicating via cellular network (not shown). Examples of cellular networks used by wireless communication device 440 include, but are not limited to GSM cellular networks, GPRS cellular networks, CDMA cellular networks, and EDGE cellular networks. In accordance with other embodiments, wireless communication device 440 is a radio-frequency transceiver compliant with, but not limited to, Wi-Fi, WiMAX, implementations of the Institute of Electrical and Electronics Engineers (IEEE) 802.11 specification, implementations of the IEEE 802.15.4 specification for personal area networks, and a short range wireless connection operating in the Instrument Scientific and Medical (ISM) band of the radio frequency spectrum in the 2400-2484 MHz range (e.g., implementations of the Bluetooth® standard) including Bluetooth Low Energy (BLE) implementations, implementations of the IEEE 1902.1 (RuBee) specification, implementations of IEEE 802.15 (ZigBee) standard, etc. It is noted that movement sensor 400 may utilize multiple wireless communication devices 440 operable in separate and distinct wireless communication networks. In FIG. 4, I/O device 450 comprises one or more interfaces with various networked devices. Examples of networks with which I/O device 450 is configured to be coupled with include, but are not limited to, controller area network (CAN) buses used to report data within a vehicle, Ethernet port(s), universal serial bus (USB) ports, and/or special purpose interfaces. In accordance with various embodiments, optional gyroscope 460 is configured to detect changes in angular momentum of movement sensor 400. In accordance with various embodiments, gyroscope 460 comprises a 3-axis MEMS gyroscope configured to detect changes in angular momentum of movement sensor 400. It is noted that other types of gyroscopes may be implemented in various embodiments including, but not limited to, fiber-optic gyroscopes, vibrating structure gyroscopes, etc. In accordance with various embodiments, optional gyroscope 460 is monitored by a processor (e.g., 130 of FIG. 1) to determine whether the threshold net movement parameter of antenna 232 has been exceeded after GNSS receiver 110 has been shut down. Also shown in FIG. 4 is an optional electronic compass 470 which is configured to detect a change in the direction in which a mobile machine (e.g., 600 of FIG. 6) is headed. In accordance with one embodiment, a first direction in which mobile machine 600 is headed is stored in memory 430 when GNSS receiver 110 is being shut down. Upon power up of GNSS receiver 110, the direction in which mobile machine 600 is headed is determined and, using processor 420 for example, compared with the direction in which mobile machine 600 was headed when GNSS receiver 110 was being shut down. In accordance with at least one embodiment, if there is a discrepancy in the two headings which exceeds a threshold parameter, an indication can be sent which may be used in determining whether to use short convergence algorithm 111 or long convergence algorithm 112.

FIG. 5 is a block diagram of an example image-based movement sensor 500 in accordance with various embodiments. In accordance with various embodiments, movement sensor 500 comprises a self-contained movement sensor (e.g., 120 of FIG. 1) which can be used as a movement detection and reporting device. In FIG. 5, movement sensor 500 comprises an image capture device 510, a processor 520, a memory 530, and an input/output (I/O) device 540 which are coupled with a bus. In accordance with various embodiments, image capture device 510 comprises a digital camera, a digital video camera, a digital camcorder, a stereo digital camera, a stereo video camera, an image intensifier, a charge coupled device (CCD) including intensified CCD (ICCD) devices, a complimentary metal-oxide semiconductor (CMOS) device including intensified CMOS (ICMOS) devices, a hybrid photodiode device, a thermal imager, and/or a near-infrared illumination device. In accordance with various embodiments, image capture device 510 is used to determine whether antenna 232 has moved between the time GNSS receiver 110 was shut down and when GNSS receiver 110 was subsequently powered up. In accordance with at least one embodiment, analysis of images from image capture device 510 are processed by processor 520 to determine whether antenna 232 has been moved beyond a threshold net movement parameter. This can comprise, for example, an identification of common features/landmarks in a succession of images and an analysis or estimate of how far GNSS receiver 110 may have moved while GNSS receiver 110 has been shut down. For example, processor 520 of FIG. 5, or processors 130 of FIG. 1 and processor(s) 130A-130C of FIG. 3, may be configured to perform photogrammetric analysis of successive images to determine whether net movement of antenna 232 has occurred and whether that net movement exceeds a threshold net movement parameter. In accordance with at least one embodiment, image capture device 510 is oriented in a downward position (e.g., toward the ground) and detection of movement of antenna 232 is accomplished by correlating successive images of the ground. Processor 520 is for processing information and instructions and may be any of various types of microprocessors. In accordance with at least one embodiment, processor 520 is configured to implement a method of implementing convergence selection of a GNSS receiver as described herein. Alternatively, processor 520 is configured to receive instructions, messages, and queries from another source which cause it to record, or report movement, as detected by image capture device 510, while GNSS receiver 110 is shut down. Memory 530 is for storing instructions for processor 520 and for storing indications and/or measurements of movement as detected by image capture device 510. In FIG. 5, I/O device 540 comprises one or more interfaces with various networked devices. Examples of networks with which I/O device 540 is configured to be coupled with include, but are not limited to, controller area network (CAN) buses used to report data within a vehicle, Ethernet port(s), universal serial bus (USB) ports, and/or special purpose interfaces.

In accordance with various embodiments, movement sensor 500 can receive a message from a processor (e.g., 130 of FIG. 1, or 130A-130C of FIG. 3) which initiates capturing a one or more image(s) using image capture device 510 when a shut down of GNSS receiver 110 is to occur. Upon power up of GNSS receiver 110, processor 130, or processors 13A-130C of FIG. 3, generates a message or query as to whether antenna 232 has moved beyond a threshold net movement parameter since shut down. In accordance with various embodiments, movement sensor 500 will capture at least a second image. In one embodiment, movement sensor 500 can perform an analysis of the two images to determine if net movement of GNSS receiver 110 has exceeded the threshold net movement parameter or not. Movement sensor 500 can generate a message indicating that GNSS receiver 110 has/has not exceeded the threshold net movement parameter. Alternatively, movement sensor 500 can generate a message indicating the estimated distance GNSS receiver 110 has moved since shut down. In accordance with another embodiment, movement sensor 500 can send the successive images to processor 130, or 130A-130C, for processing to determine whether net movement of antenna 232 has exceeded the threshold net movement parameter since it was shut down.

The use of image capture device 510 to detect net movement of antenna 232 has the advantage that it does not require being powered up the entire time GNSS receiver 110 is shut down. For example, in response to a message that GNSS receiver 110 is being shut down, processor 520 can cause image capture device 510 to capture an image to be used for comparison later to determine whether, and how far, antenna 232 has moved while GNSS receiver 110 has been shut down. This first image can be stored locally in memory 530, or sent to another location such as computer system 300. In accordance with at least one embodiment, movement sensor 500 can then be shut down. When GNSS receiver 110 is powered up later, movement sensor 500 can be powered up as well and a second image can be recorded by image capture device 510. Again, this can be stored locally in memory 530 or sent to another location such as computer system 300. As described above, processing of the images can also be performed using processor 520 to determine whether net movement of antenna 232 exceeds a threshold net movement parameter. The usage of image capture device 510 for movement detection even permits movement of the mobile machine after shut down of the GNSS receiver 110 from its shut down position to a completely different position, as long as antenna 232 is moved back to its original position at shut down before it is powered up again. In this case it is still allowed to select the short convergence algorithm.

Example Agricultural Vehicle

Figure 6:
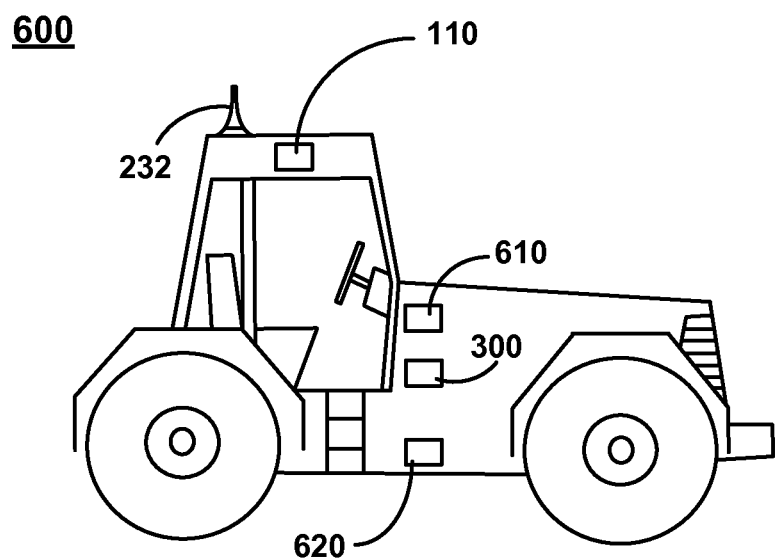
FIG. 6 shows an example agricultural vehicle having an example navigation system in accordance with various embodiments.

FIG. 6 shows an example agricultural vehicle 600 (e.g., a mobile machine) having an example navigation system in accordance with various embodiments. In FIG. 6, agricultural vehicle 600 is one example of a mobile machine and comprises a steering wheel turn sensor 610 and a transmission sensor 620 which are coupled with a computer system 300 (e.g., a vehicle navigation system or telematics box according to various embodiments). In accordance with various embodiments, steering wheel turn sensor 610 and transmission sensor 620 are coupled with computer system 300 via a CAN bus network (not shown) and act as a movement sensor system. In accordance with various embodiments, various sensors such as wheel turn sensor 610 and transmission sensor 620 can be used to compile an indication that agricultural vehicle 600, and thus antenna 232, has been moved. In FIG. 6, steering wheel turn sensor 610 is used to detect, and report to computer system 300, whether an operator has turned the steering wheel of agricultural vehicle 600 after GNSS receiver 110 has been shut down. Also, transmission sensor 620 is used to detect, and report to computer system 300, whether the transmission of agricultural vehicle 600 has been engaged after GNSS receiver 110 has been shut down. In accordance with at least one embodiment, if the steering wheel of agricultural vehicle 600 has been turned, and/or if the transmission of agricultural vehicle 600 has been engaged, after GNSS receiver 110 has been shut down, such determination is interpreted by computer system 300 that, by default, a movement threshold parameter has been exceeded. In some embodiments, when such a "by default" violation of the movement threshold occurs, it does not matter what the net movement has been and it need not be checked. More specifically, it provides an indication that agricultural vehicle 600 has been operated after GNSS receiver 110 has been shut down. In accordance with various embodiments, other sensors such as a tire rotation sensor which indicates the rotation of one or more tires of agricultural vehicle 600 may be used to determine whether agricultural vehicle 600 has moved, or how far as well. It is noted that many mobile machines come configured with various sensors which report, via their respective CAN bus networks, operating parameters of the mobile machine such as odometers, engine and transmission monitors, tachometers, etc. In accordance with various embodiments, these devices can be used as a movement sensor 120 to determine whether agricultural vehicle 600 has had a net movement and/or a net movement which exceeds a threshold net movement parameter.

Example Method of Implementing Convergence Selection

FIG. 7 is a flowchart 700 of a method of implementing convergence selection of a GNSS receiver in accordance with at least one embodiment. In operation 710 of FIG. 7, a GNSS receiver which is coupled with a mobile machine is shut down, wherein said GNSS receiver is in a converged state at shut down. In accordance with various embodiments, a processor 130 can transition the GNSS receiver 110 to the shut down state and as part of this transition can generate a message to a movement sensor 120 prior to the shut down of GNSS receiver 110. The message directs the movement sensor 120 to monitor movement (e.g., of a mobile machine with which antenna 232 is coupled) while GNSS receiver 110 is shut down. Alternatively, movement sensor 120 may comprise a dedicated movement detection sensor (e.g., 400 or 500 of FIGS. 4 and 5 respectively) which can be integrated into convergence selection system 100. In accordance with at least one embodiment, processor 130 comprises a component of a vehicle navigation system/telematics box and movement sensor 120 is disposed outside of the vehicle navigation system/telematics box. In accordance with another embodiment, processor 130 comprises a component of a vehicle navigation system/telematics box and movement sensor 120 comprises a component of the vehicle navigation system/telematics box.

In operation 720 of FIG. 7, a movement sensor is monitored to determine if net movement of a GNSS antenna (e.g., 232) coupled with the mobile machine exceeds a threshold net movement parameter while said GNSS receiver is shut down. In accordance with various embodiments, a threshold net movement parameter is set which is typically the size of the expected precision of the GNSS sensor (e.g. 2 cm for high precision sensors, or 10 cm or more for less advanced applications), for periods in which GNSS receiver 110 is shut down. If the net movement of GNSS receiver 110 exceeds that threshold net movement parameter while GNSS receiver 110 is shut down, a long convergence algorithm (e.g., 112 of FIG. 1) is initiated when GNSS receiver 110 is subsequently powered up. In some embodiments, certain inputs or combinations of inputs from one or more movement sensors may be considered a default violation of the threshold net movement parameter, regardless of an amount of net movement. In accordance with various embodiments, a processor 130 can generate a message to a movement sensor 120 prior to the shut down to monitor movement (e.g., of a mobile machine with which GNSS receiver 110 is coupled) while GNSS receiver 110 is shut down. Alternatively, movement sensor 120 may be configured to continuously monitor movement of a mobile machine (e.g., agricultural vehicle 600 of FIG. 6) with which GNSS receiver 110 is coupled, or periodically such as when agricultural vehicle 600 is shut down. In various embodiments, monitoring a movement sensor may comprise one or some combination of: monitoring an accelerometer/monitoring at least one accelerometer, monitoring an image capture device/monitoring at least one image capture device, monitoring a steering wheel turn sensor, and/or monitoring a transmission sensor. In accordance with one embodiment, movement sensor 120 comprises at least one accelerometer (e.g., 410 of FIG. 4) which is monitored in operation 720. Accelerometer 410 may be a discreet component, or a sub-component such as accelerometer 410 of FIG. 4. In another embodiment, movement sensor 120 comprises at least one image capture device (e.g., image capture device 510 of FIG. 5) which is monitored in operation 720. In another embodiment, movement sensor 120 comprises a steering wheel turn sensor 610 and a transmission sensor 620 as shown in FIG. 6. Monitoring whether a steering wheel of said mobile machine has been turned and/or monitoring whether a transmission of said mobile machine has been turned are some example techniques for determining whether the mobile machine has moved and/or has moved in excess of an established threshold.

In operation 730 of FIG. 7, upon power up of said GNSS receiver, a shorter convergence algorithm (e.g., short convergence algorithm 111 of FIG. 1) is initiated in response to determining that said threshold net movement parameter has not been exceeded and a longer convergence algorithm (e.g., long convergence algorithm 112 of FIG. 1) is initiated in response to determining that said threshold net movement parameter has been exceeded. In one embodiment, a computer system such as computer system 300 initiates the shorter or longer convergence algorithm as required. In accordance with one embodiment, processor 130 accesses a memory or data storage device (e.g., 311 or 312 respectively of FIG. 3, 430 or 530 of FIGS. 4 and 5 respectively) to receive data which indicates that movement of a mobile machine has occurred and/or whether that net movement has exceeded a threshold net movement parameter. In accordance with another embodiment, processor 130 generates a message to retrieve movement data from a memory (e.g., 430 or 530 of FIGS. 4 and 5 respectively) or from a movement sensor 120. This allows processor 130 to receive movement data which indicates that movement of a mobile machine has occurred and/or whether that movement has exceeded a threshold net movement parameter. In accordance with one embodiment, it may be determined from the movement data that the shorter convergence algorithm (e.g., 111 of FIG. 1) is to be used if the movement of GNSS receiver 110 has not exceeded a threshold net movement parameter while it was shut down. Conversely, it may be determined from the movement data that the longer convergence algorithm (e.g., 112 of FIG. 1) is to be used if the movement of GNSS receiver 110 has exceeded a threshold net movement parameter while it was shut down. If the movement data is in the form of a translation vector, the movement can be even used to update the stored position and then trigger the short convergence algorithm. Basically there are no restrictions in the size of the translation vector as long as it can be determined within the precision given by the threshold net movement parameter.

In one embodiment, movement of the GNSS receiver (or mobile machine to which it is coupled) is continually monitored by processor 130 during the execution of the shorter convergence algorithm (e.g., 111 of FIG. 1). If, based on this continual monitoring, movement of antenna 232 exceeds the threshold net movement parameter prior to completing the short convergence algorithm 111, the long convergence algorithm is initiated. This prevents the problem occurring of using the short convergence algorithm 111 when antenna 232 has moved more than the threshold net movement parameter while GNSS receiver 110 was shut down which can again result in a much longer convergence process occurring than would have been necessary if the long convergence algorithm 112 had been used originally. Alternatively, in at least one embodiment it is allowed that antenna 232 can be moved by any size of distance during the execution of the short convergence algorithm 111, so long as the first position of antenna 232 at the power up time is known. Based on the first position, ambiguities are computed in a certain linear combination of L1 and L2 ambiguities. The quality of these ambiguities is improved during convergence by the increasing knowledge of the tropospheric conditions as the fundamental idea of the short convergence algorithm is that these ambiguities are not changing anymore, independent of whether antenna 232 is moved or not.

Figure 8:
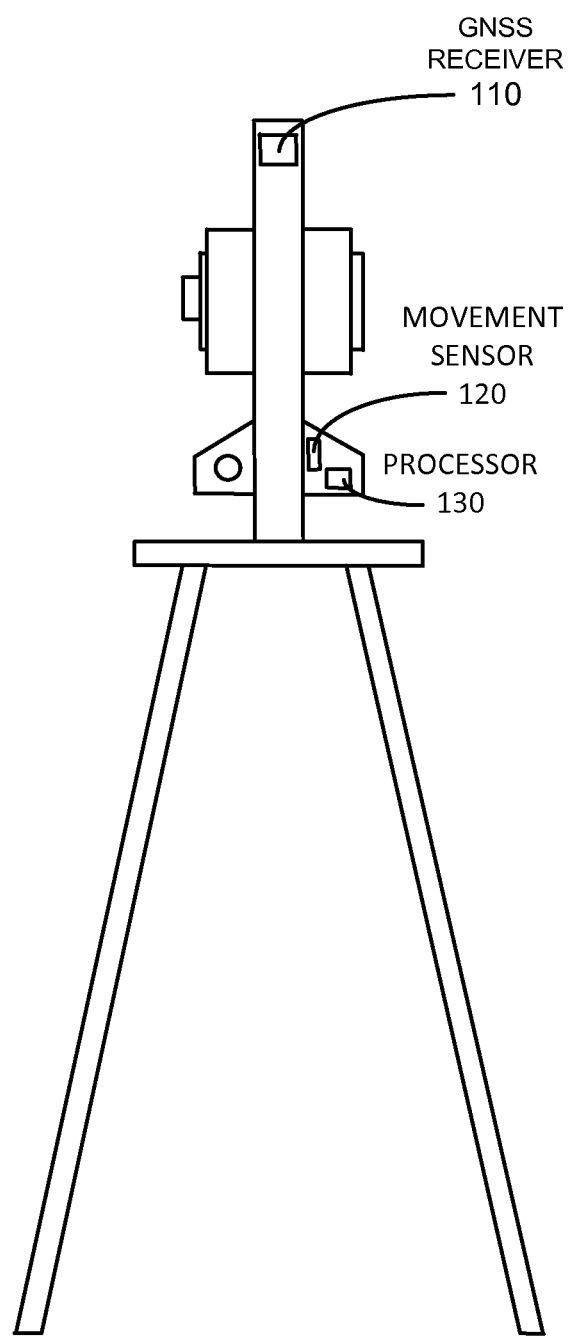
FIG. 8 shows an example non-mobile device using a convergence selection system in accordance with various embodiments.

FIG. 8 shows an example non-mobile device 800 using a convergence selection system in accordance with various embodiments. In the example of FIG. 8, non-mobile device 800 comprises a tripod mounted surveying instrument. An example tripod mounted surveying instrument comprises a total station which is known in the art as an electro-optical device which is used mainly in surveying and construction applications. For the purpose of the following discussion, non-mobile device 800 will be referred to as "total station 800". In FIG. 8, total station 800 comprises a GNSS receiver 110, a movement sensor 120, and a processor 130 as described above. According to various embodiments, movement sensor 120 can be implemented as movement sensors (e.g., inertial measurement unit (IMU) 400 and/or 500 as described above. In accordance with various embodiments, movement sensor 120 is configured to detect when movement of total station 800 exceeds a threshold net movement parameter as described above. In response to determining that the threshold net movement parameter has not been exceeded, processor 130 of FIG. 8 will select short convergence algorithm 111 of FIG. 1 when total station 800 is restarted. Alternatively, in response to determining that the threshold net movement parameter has been exceeded, processor 130 will select long convergence algorithm 112 of FIG. 1 when total station 800 is restarted. Thus, in instances when total station 800 is shut down to conserver battery power, or to change batteries, processor 130 will determine whether it is necessary to select short convergence algorithm 111 or long convergence algorithm 112.

Figure 9:
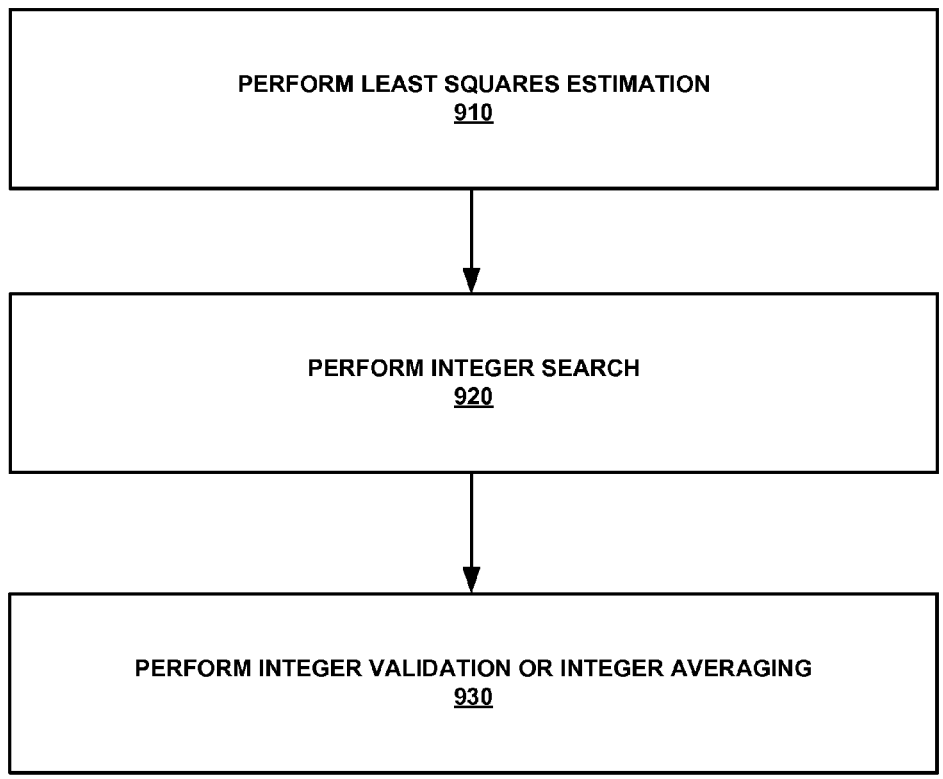
FIG. 9 is a flowchart of an example ambiguity resolution procedure in accordance with at least one embodiment.

FIG. 9 is a flowchart of an example ambiguity resolution procedure 900 in accordance with at least one embodiment. In operation 910 of FIG. 9, a least squares estimation is performed. In accordance with at least one embodiment, the least squares estimation is performed to minimize the costFunction and is performed according to the equation below:

$$costFunction = \sum_{obs} [obs - \text{model}(obs)]^2 \quad \text{Equation 1}$$

In Equation 1, the term "model(obs)" refers to the modeled variables which affect determination of the distance between a GNSS receiver 110 and each observed satellite. These factors include, but are not limited to, a sum of the distance between the satellite and GNSS receiver 110, tropospheric delay effects, ionospheric delay effects, clock error, ephemeris error, the wavelength of the received signal times the integer ambiguity of the carrier phase. In accordance with at least one embodiment, the model observations for each satellite in sight of GNSS receiver 110 are subtracted from the signals received by GNSS receiver 110 from each of the respective satellites and the difference is then squared. This facilitates estimating float values for the receiver position (e.g., of GNSS receiver 110), tropospheric delay of satellite signals, ionospheric delay of satellite signals, as well as integer ambiguities to all satellites on all frequency bands. As a result of the least squares estimation of operation 910, a float ambiguity vector and an ambiguity covariance matrix of an estimated solution is generated.

In operation 920 of FIG. 9, an integer search is performed. In accordance with at least one embodiment, the float ambiguity vector and ambiguity covariance matrix of the estimated solution is operated upon to find the integer ambiguity vectors that result in the smallest costFunction value. As a result, a listing of the best, second best, third best, etc. integer ambiguity vector candidates is generated. As an example, an initial estimate of the number of carrier wavelengths (e.g., one hundred million, one hundred thousand wavelengths) between a given satellite and GNSS receiver 110 is generated. A costFunction operation is performed to determine a costFunction value. The number of carrier wavelengths between the satellite and GNSS receiver 110 can then be incremented (e.g., one hundred million, one hundred thousand and one wavelengths) and a costFunction is then performed to determine a costFunction value for this new number of wavelengths between the satellite and GNSS receiver 110. If the costFunction value decreases, it indicates that incrementing the number of wavelengths between the satellite and GNSS receiver 110 is resulting in a more accurate ambiguity vector candidate. If the number of carrier wavelengths between the satellite and GNSS receiver is incremented again, and the costFunction value increases, this indicates that the ambiguity vector candidate is less accurate than the previous iteration in which the costFunction value decreased and that the previous number of wavelengths between the satellite and GNSS receiver 110 (e.g. one hundred million, one hundred thousand and one) is the most accurate number of whole wavelengths between the satellite and GNSS receiver 110. As a result, a listing of integer ambiguity candidates is generated which ranks them as a best estimate, a second best estimate, etc.

In operation 930 of FIG. 9, an integer validation or an integer averaging operation is performed. In accordance with one embodiment, an integer validation operation is performed when the best candidate of the listing of integer ambiguity candidates has a much smaller costFunction associated with it than the next best integer ambiguity candidate. For example, the best candidate may be accepted as the "correct" candidate if the value of the costFunction associated with second best candidate is twice as high as the costFunction associated with the best candidate (e.g., if the ratio of the costFunction associated with second best candidate to the costFunction associated with the best candidate is two). In accordance with at least one embodiment, in order to avoid defining a certain ratio threshold for accepting the best candidate, integer averaging is performed. In accordance with at least one embodiment, the integer averaging operation is performed according to the equation below:

$$\text{weighted mean integer ambiguity vector} = \sum_{candidates} \text{weight}(candidate) * candidate \quad \text{Equation 2}$$

In accordance with at least one embodiment, the covariance matrix is given by the scatter of the candidates around the weighted mean of the candidates (in the usual way as the covariance matrix C of a number of given vectors $v_i=1, \ldots, n$ is defined: $C(v_1, \ldots, v_n) := \Sigma_i p_i (v_i - \bar{v}) \cdot (v_i - \bar{v})^t$ with weighted mean $\bar{v}(v_1, \ldots, v_n) := \Sigma_i p_i v_i$, normalized weight $p_i := w_i / \Sigma_j w_j$ and weight $w_i$). As a result of either of the integer validation or integer averaging operation, a distance between GNSS receiver 110 and a given satellite is derived.

Figure 10:
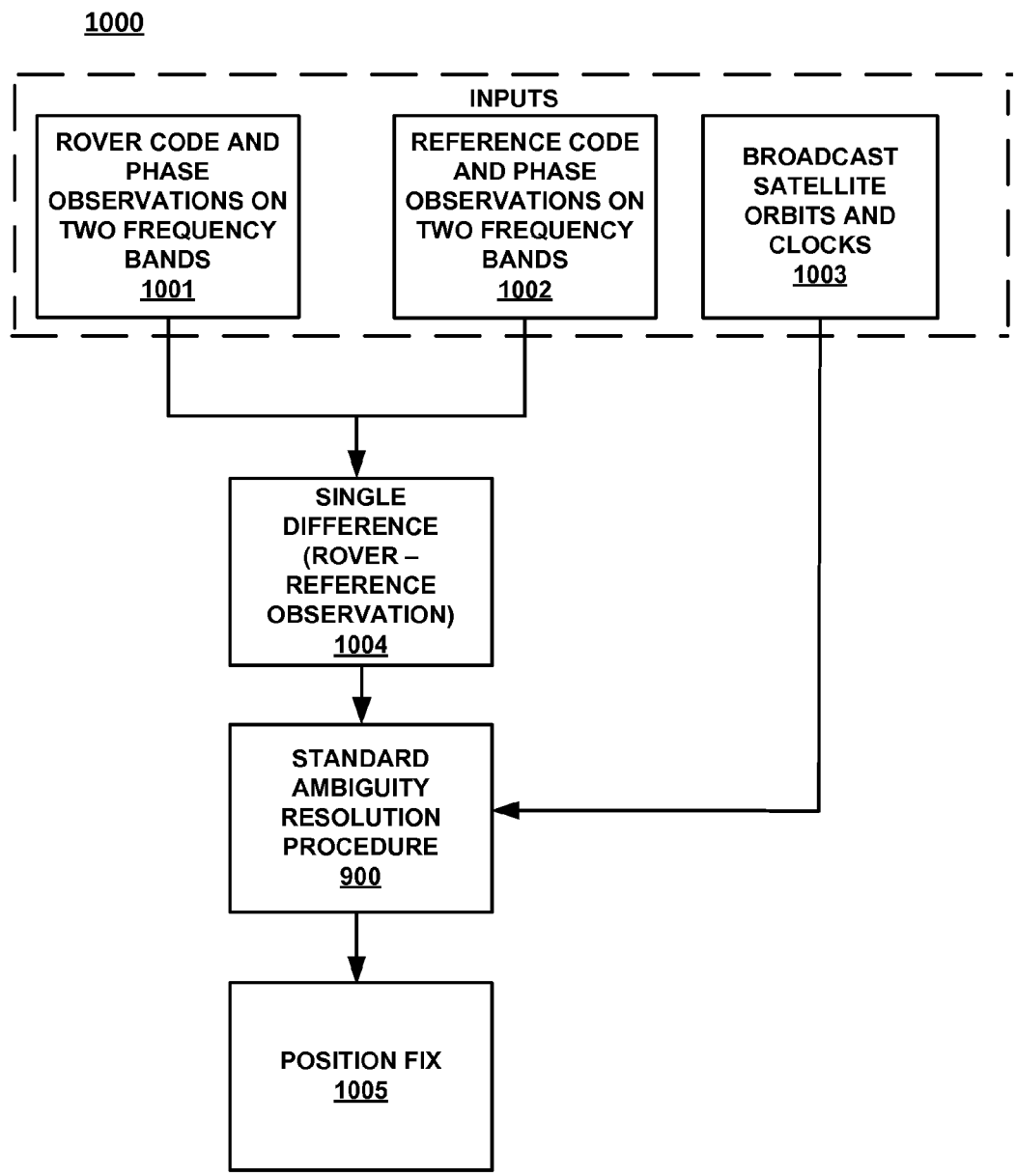
FIG. 10 is a flowchart of an example Real-time Kinematic (RTK) processing process in accordance with at least one embodiment.

FIG. 10 is a flowchart of an example Real-time Kinematic (RTK) processing process 1000 in accordance with at least one embodiment. It is noted that in accordance with various embodiments, the convergence selection operations described above are performed by a GNSS receiver (e.g., 110) which is operating in the Precise Positioning Mode and the operations described below with reference to FIG. 10 are not performed. In operation 1001 of FIG. 10, rover code and phase observations on 2 frequency bands are received. In accordance with various embodiments, the code and carrier phase observations are received by GNSS receiver 110.

In operation 1002 of FIG. 10, reference code and phase observations on two frequency bands are received. In accordance with various embodiments, the reference code and carrier phase observations of operation 1002 are received at an RTK reference station (not shown) and transmitted to a GNSS receiver.

In operation 1003 of FIG. 10, broadcast satellite orbits and clock information for each satellite in view are received. This satellite orbit and clock information is used later in the least squares estimation operation 900 below.

In operation 1004 of FIG. 10, a single differencing operation is performed in which reference code and phase observations are subtracted from the rover's code and phase observations. This significantly reduces ionospheric error as ionospheric delay is typically the same, or similar, for both the rover and the reference station at normal operating distances (e.g., approximately ten kilometers). Additionally, the single differencing operation is used to reduce satellite clock error and orbit errors.

In operation 900, the standard ambiguity resolution procedure described above with reference to FIG. 9 is performed. Operation 900 of FIG. 10 refers to the operations described above with reference to FIG. 9 to derive a distance from GNSS receiver 110 and each given satellite in view of GNSS receiver 110.

In operation 1005, a position fix is output. Based upon the derived distances between GNSS receiver 110 and four or more satellites, a position fix for GNSS receiver 110 can be derived.

Figure 11:
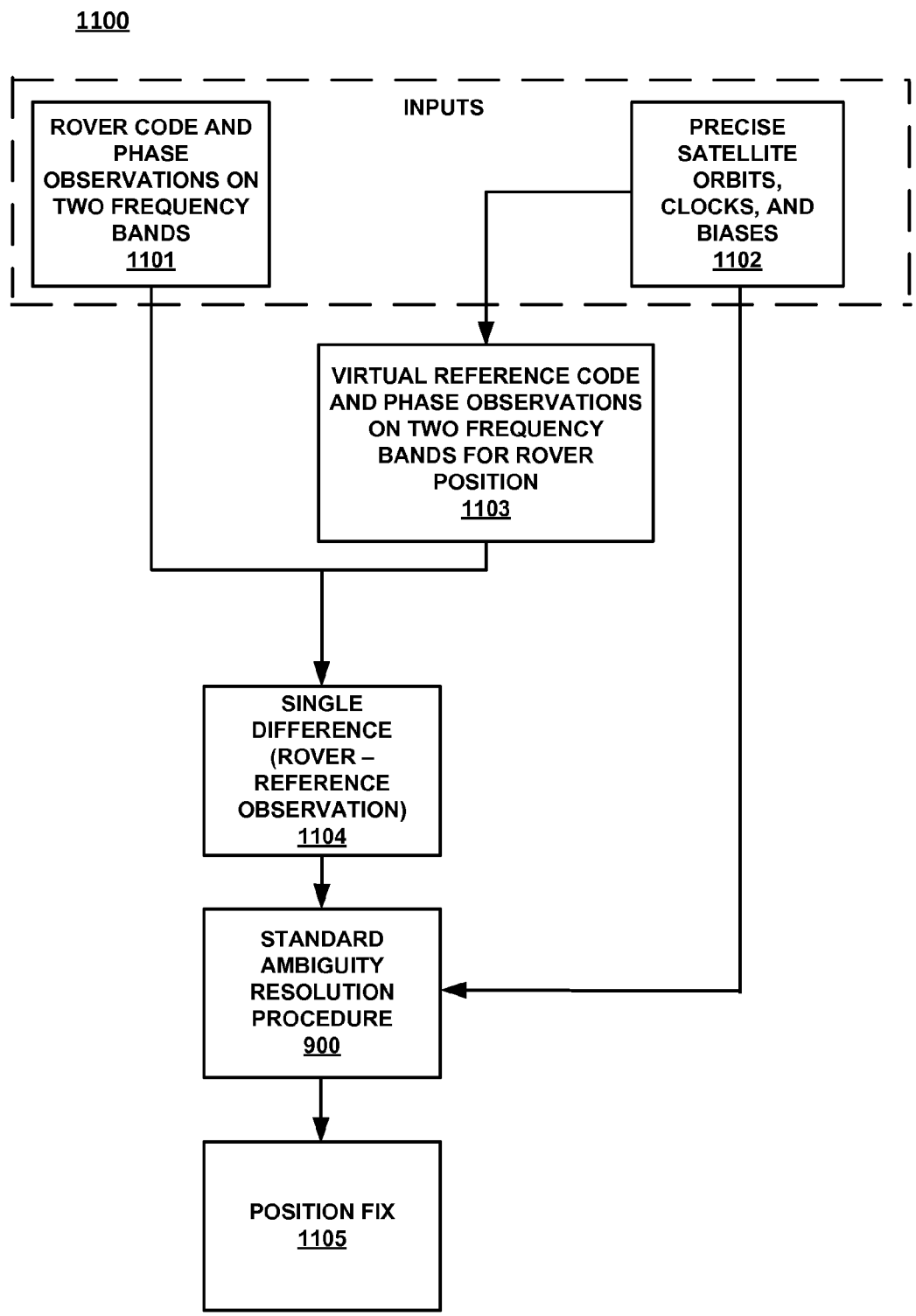
FIG. 11 is flowchart of operations performed in an example long convergence algorithm process in accordance with at least one embodiment.

FIG. 11 is flowchart of operations performed in an example long convergence algorithm process 1100 in accordance with at least one embodiment. In accordance with at least one embodiment, long convergence algorithm process 1100 is implemented as long convergence algorithm 112 described above. In operation 1101, rover code and phase observations on two frequency bands are received. In accordance with various embodiments, these code and phase observations are received by GNSS receiver 110.

In operation 1102 of FIG. 11, precise satellite orbits, clocks, and biases are derived. As described above in a PPP network, a worldwide network of GNSS reference receivers monitor the signals from each GNSS satellite. A central location then generates precise orbital, clock, and bias data for each satellite. This information is derived in operation 1102 and sent as a correction stream to GNSS receivers.

In operation 1103 a model of virtual reference code and phase observations on two frequency bands is derived. In accordance with at least one embodiment, the model of virtual reference code and phase observations is a description of the expected code and phase measurements at the location at which GNSS receiver 110 is located. In accordance with at least one embodiment, this model is derived at least in part based upon the precise satellite orbits, clocks, and biases derived in operation 1102.

In operation 1104 of FIG. 11, a single differencing operation is performed in which the modelled virtual reference code and phase observations are subtracted from the rover's code and phase observations. Typically, this operation will not account for ionospheric error because ionospheric delay is not modelled in the virtual reference (e.g., operation 1103). However, the single differencing operation is used to reduce satellite clock error and orbit errors.

In operation 900, the standard ambiguity resolution procedure described above with reference to FIG. 9 is performed. In the example of FIG. 11, the precise satellite orbits, clocks, and biases are used as inputs in the least squares estimation (e.g., operation 910 of FIG. 9) to minimize the costFunction. Again, operation 900 is used to derive a distance from GNSS receiver 110 and each given satellite in view of GNSS receiver 110.

In operation 1105, a position fix is output. Based upon the distance from GNSS receiver 110 to at least four satellites, a position of GNSS receiver 110 can then be derived together with the receiver clock error.

Figure 12:
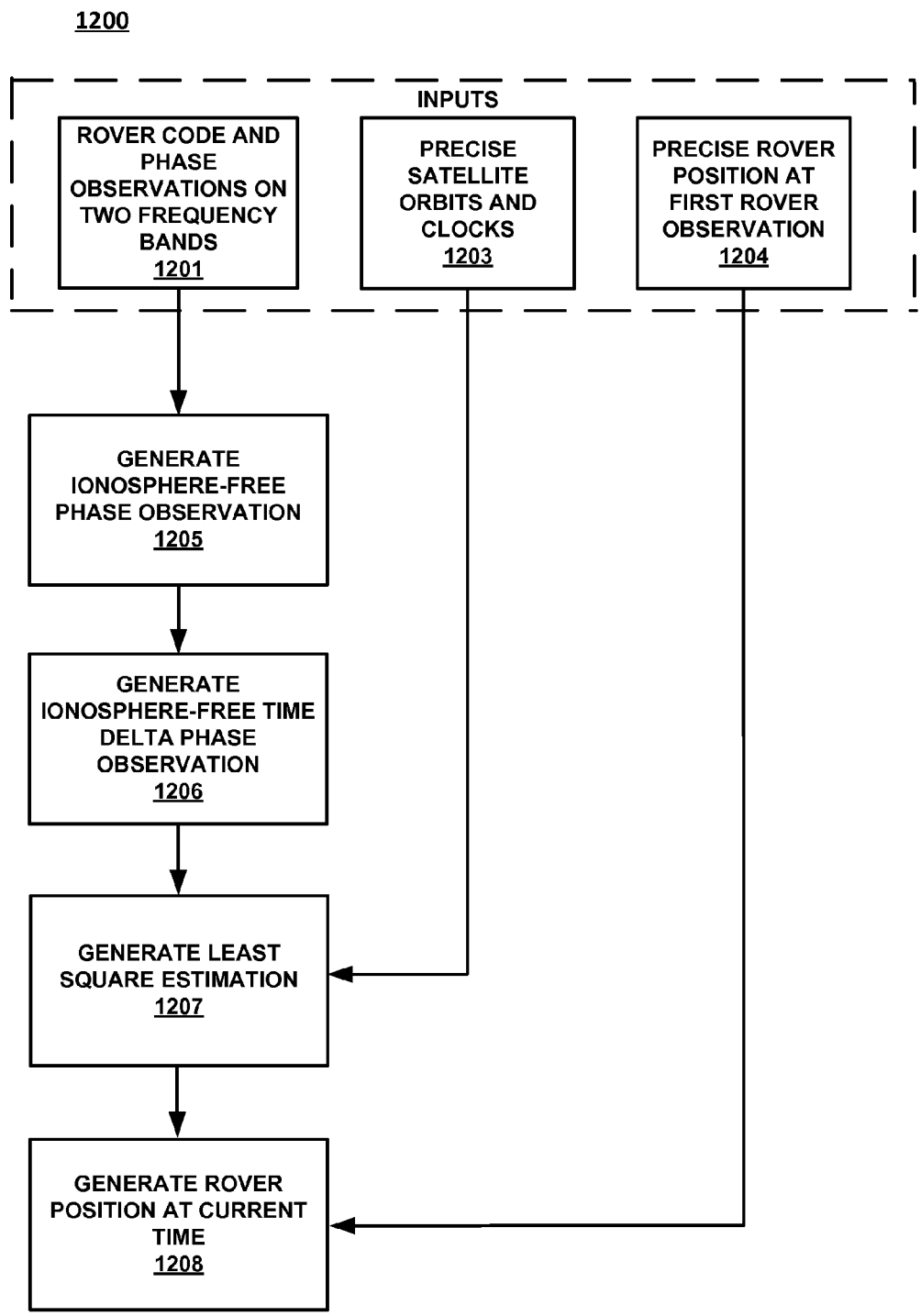
FIG. 12 is a flowchart of operation performed in and example short convergence algorithm process in accordance with at least one embodiment.

FIG. 12 is a flowchart of operation performed in an example short convergence algorithm process 1200 in accordance with at least one embodiment. An alternative approach is described in U.S. Pub. No. 2014/0002300 A1, by Leandro et al., titled "GNSS Signal Processing with Known Position for Reconvergence." In accordance with at least one embodiment, short convergence algorithm process 1200 is implemented as short convergence algorithm 111 described above. In operation 1201 of FIG. 12, rover phase observations on two frequency bands are received. In accordance with various embodiments, these code and phase observations are received by GNSS receiver 110.

In operation 1203 of FIG. 12, precise satellite orbit and clock data is received. As described above in a PPP network, a worldwide network of GNSS reference receivers monitor the signals from each GNSS satellite. A central location then generates precise orbital, clock, and bias data for each satellite. This information is derived in operation 1102 and sent as a correction stream to GNSS receivers.

In operation 1204, a precise rover position at a first rover observation epoch is received. In accordance with various embodiments, this precise rover position is the position of the rover as it was being shut down in a converged state as described above. In accordance with at least one embodiment, this position is stored and used at the power up of GNSS receiver 110 to derive the current rover position at the current time (e.g., operation 1208 below).

In operation 1205 of FIG. 12, an iono-free (IF) phase observation is generated. In accordance with at least one embodiment, a linear combination of phase observations on different frequency bands is performed which results in the cancellation of the first order ionospheric model term. As the effects of ionospheric delay have been cancelled, a delta positions can be derived in a more precise way in the following least squares estimation process 1207.

In operation 1206 of FIG. 12, a time-delta phase observation free of ionospheric error is generated. In accordance with at least one embodiment, integer ambiguity is cancelled in operation 1206 for phase observations without cycle slips. In one embodiment, operation 1206 is described by Equation 3 below which applies to observations without cycle slip:

$$\Delta IF = IF\text{-phase}(t) - IF\text{-phase}(t-1) \quad \text{Equation 3}$$

In operation 1207 of FIG. 12, a least squares estimation process is performed. In accordance with at least one embodiment, a least squares estimation is performed. In accordance with at least one embodiment, the least squares estimation is performed to minimize the costFunction and is performed according to Equation 1 described above which is shown again:

$$costFunction = \sum_{obs} [obs - \text{model}(obs)]^2 \quad \text{Equation 1}$$

However, in operation 1207 the term "obs" is modified using the precise satellite orbits and clocks data received in a PPP corrections stream. Thus, in accordance with at least one embodiment, the term "obs" used in operation 1207 is defined as:

$$obs = \Delta IF + \Delta satClockError \quad \text{Equation 4}$$

where satellite clock error is derived from the PPP corrections stream clock data. Furthermore, the term "model(obs)" is also modified using the PPP corrections stream orbit, clock, and tropospheric delay data. Thus, in accordance with at least one embodiment, the term "model(obs)" using in operation 1207 is defined as:

$$\text{model}(obs) = \Delta \text{distance}(sat, receiver) + \Delta receiverClockError + \Delta tropoDelay \quad \text{Equation 5}$$

As a result of operation 1207, a Δreceiver position (t, t−1) value is output. This value describes the change in the receiver position between time step t−1 and t.

In operation 1208 of FIG. 12, a rover position for the current time is generated. In accordance with at least one embodiment, this is calculated according to the equation below:

$$\text{rover position at current time} = \text{rover position at first observation} + \sum_t \Delta\text{receiver position}(t, t-1) \quad \text{Equation 6}$$

As stated above with reference to operation 1204, the precise rover position at the first observation is the position of the rover as it was being shut down in a converged state as described above. In accordance with at least one embodiment, this position is stored and used at the power up of GNSS receiver 110 to derive the current rover position at the current time.

CONCLUSION

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations and illustrations. However, any two or more embodiments or features may be combined. Further, any embodiment or feature may be used separately from any other embodiment or feature. Phrases, such as "an embodiment," "one embodiment," among others, used herein, are not necessarily referring to the same embodiment. Features, structures, or characteristics of any embodiment may be combined in any suitable manner with one or more other features, structures, or characteristics.

What is claimed is:

1. A method of implementing convergence of a Global Navigation Satellite System (GNSS) receiver, the method comprising:
    shutting down the GNSS receiver, wherein the GNSS receiver is coupled with a GNSS antenna attached to a mobile machine, and wherein the GNSS receiver is in a converged state and the GNSS antenna is at a first location at shut down;
    storing the first location of the GNSS antenna at shut down;
    monitoring a movement sensor to determine whether a net movement of the GNSS antenna, while the GNSS receiver is shut down, exceeds a threshold net movement parameter; and
    upon power up of the GNSS receiver, initiating a first convergence algorithm in response to determining that the net movement of the GNSS antenna, while the GNSS receiver is shut down, does not exceed the threshold net movement parameter, and initiating a second convergence algorithm in response to determining that the net movement of the GNSS antenna, while the GNSS receiver is shut down, meets or exceeds the threshold net movement parameter, wherein:
    the first convergence algorithm comprises:
    generating ionosphere-free phase observations based on code and phase observations received by the GNSS receiver upon power up;
    generating ionosphere-free time delta phase observations based on the ionosphere-free phase observations, wherein integer ambiguity is cancelled in the ionosphere-free time delta phase observations;
    generating least square estimations for minimizing a cost function, wherein the cost function is based on differences between the ionosphere-free time delta phase observations and modeled parameters derived from ephemeris satellite orbit and clock data received from a network of GNSS reference receivers, and wherein the least square estimations result in one or more values, each value representing a change of the GNSS antenna's position in a respective time interval of (t−1, t); and
    estimating a current location of the GNSS antenna by obtaining a sum of the one or more values resulted from the least square estimations and adding the stored first location of the GNSS antenna at shut down to the sum; and
    the second convergence algorithm comprises estimating the current location of the GNSS antenna using a carrier phase ambiguity resolution procedure based on the code and phase observations received by the GNSS receiver upon power up and the ephemeris satellite orbit and clock data received from the network of GNSS reference receivers.

2. The method of claim 1 wherein the mobile machine is equipped with a telematics system, and the movement sensor is not a component of the telematics system.

3. The method of claim 1 wherein the mobile machine is equipped with a telematics system, and the movement sensor comprises a component of the telematics system.

4. The method of claim 1 wherein monitoring the movement sensor further comprises:
    monitoring an accelerometer.

5. The method of claim 1 wherein monitoring the movement sensor further comprises:
    monitoring an image capture device.

6. The method of claim 1 wherein monitoring the movement sensor further comprises:
    monitoring whether a transmission of the mobile machine is engaged.

7. The method of claim 1 wherein monitoring the movement sensor further comprises:
    monitoring whether a steering wheel of the mobile machine is turned.

8. The method of claim 1 further comprising:
    generating a message to the movement sensor during shut down which causes the movement sensor to record movement of the mobile machine while the GNSS receiver is shut down.

9. The method of claim 1 further comprising:
    upon power up of the GNSS receiver, generating a message to the movement sensor for movement data indicating whether the mobile machine has moved while the GNSS receiver is shut down.

10. A non-transitory computer readable storage medium having computer readable instructions stored thereon for causing a computer system to perform a method of implementing convergence of a Global Navigation Satellite System (GNSS) receiver, the method comprising:
    shutting down the GNSS receiver, wherein the GNSS receiver is coupled with a GNSS antenna attached to a mobile machine, and wherein the GNSS receiver is in a converged state and the GNSS antenna is at a first location at shut down;
    storing the first location of the GNSS antenna at shut down;
    monitoring a movement sensor to determine if a net movement of the GNSS antenna, while the GNSS receiver is shut down, exceeds a threshold net movement parameter; and
    upon power up of the GNSS receiver, initiating a first convergence algorithm in response to determining that the net movement of the GNSS antenna, while the GNSS receiver is shut down, does not exceed the threshold net movement parameter, and initiating a second convergence algorithm in response to determining that the net movement of the GNSS antenna, while the GNSS receiver is shut down, meets or exceeds the threshold net movement parameter, wherein:

the first convergence algorithm comprises:
generating ionosphere-free phase observations based on code and phase observations received by the GNSS receiver upon power up;
generating ionosphere-free time delta phase observations based on the ionosphere-free phase observations, wherein integer ambiguity is cancelled in the ionosphere-free time delta phase observations;
generating least square estimations for minimizing a cost function, wherein the cost function is based on differences between the ionosphere-free time delta phase observations and modeled parameters derived from ephemeris satellite orbit and clock data received from a network of GNSS reference receivers, and wherein the least square estimations result in one or more values, each value representing a change of the GNSS antenna's position in a respective time interval of (t−1, t); and
estimating a current location of the GNSS antenna by obtaining a sum of the one or more values resulted from the least square estimations and adding the stored first location of the GNSS antenna at shut down to the sum; and the second convergence algorithm comprises estimating the current location of the GNSS antenna using a carrier phase ambiguity resolution procedure based on the code and phase observations received by the GNSS receiver upon power up and the ephemeris satellite orbit and clock data received from the network of GNSS reference receivers.

11. The non-transitory computer readable storage medium of claim 10 wherein monitoring the movement sensor further comprises:
monitoring an accelerometer.

12. The non-transitory computer readable storage medium of claim 10 wherein monitoring the movement sensor further comprises:
monitoring an image capture device.

13. The non-transitory computer readable storage medium of claim 10 wherein monitoring the movement sensor further comprises:
monitoring whether a transmission of the mobile machine is engaged.

14. The non-transitory computer readable storage medium of claim 10 wherein monitoring the movement sensor further comprises:
monitoring whether a steering wheel of the mobile machine is turned.

15. The non-transitory computer readable storage medium of claim 10 wherein the method further comprises:
generating a message to the movement sensor during shut down which causes the movement sensor to record movement of the mobile machine while the GNSS receiver is shut down.

16. The non-transitory computer readable storage medium of claim 10 wherein the method further comprises:
upon power up of the GNSS receiver, generating a message to the movement sensor for movement data indicating whether the mobile machine has moved while the GNSS receiver is shut down.

17. A navigation system comprising:
a Global Navigation Satellite System (GNSS) receiver coupled with a GNSS antenna which is attached to a mobile machine;
a movement sensor configured to monitor a net movement of the GNSS antenna while the GNSS receiver is shut down; and
a processor configured to cause the GNSS receiver to transition into a shut down state from a converged state while the GNSS antenna is at a first location, to store the first location of the GNSS antenna at shut down, upon subsequent power up of the GNSS receiver, to initiate a first convergence algorithm in response to determining that the net movement of the GNSS antenna, while the GNSS receiver is shut down, does not exceed a threshold net movement parameter, and to initiate a second convergence algorithm in response to determining that the net movement of the GNSS antenna, while the GNSS receiver is shut down, meets or exceeds the threshold net movement parameter, wherein:
the first convergence algorithm comprises:
generating ionosphere-free phase observations based on code and phase observations received by the GNSS receiver upon power up;
generating ionosphere-free time delta phase observations based on the ionosphere-free phase observations, wherein integer ambiguity is cancelled in the ionosphere-free time delta phase observations;
generating least square estimations for minimizing a cost function, wherein the cost function is based on differences between the ionosphere-free time delta phase observations and modeled parameters derived from ephemeris satellite orbit and clock data received from a network of GNSS reference receivers, and wherein the least square estimations result in one or more values, each value representing a change of the GNSS antenna's position in a respective time interval of (t−1, t); and
estimating a current location of the GNSS antenna by obtaining a sum of the one or more values resulted from the least square estimations and adding the stored first location of the GNSS antenna at shut down to the sum; and
the second convergence algorithm comprises estimating the current location of the GNSS antenna using a carrier phase ambiguity resolution procedure based on the code and phase observations received by the GNSS receiver upon power up and the ephemeris satellite orbit and clock data received from the network of GNSS reference receivers.

18. The navigation system of claim 17 further comprising a telematics system, and wherein the movement sensor is not a component of the telematics system.

19. The navigation system of claim 17 further comprising a telematics system, and wherein the movement sensor comprises a component of the telematics system.

20. The navigation system of claim 17 wherein the movement sensor comprises at least one accelerometer.

21. The navigation system of claim 17 wherein the movement sensor comprises at least one image capture device.

22. The navigation system of claim 17 wherein the movement sensor comprises a component for determining whether a transmission of the mobile machine is engaged.

23. The navigation system of claim 17 wherein the movement sensor comprises a component for determining whether a steering wheel of the mobile machine is turned.

24. The navigation system of claim 17 wherein the movement sensor comprises a gyroscope.

* * * * *